US012602192B2

(12) United States Patent      (10) Patent No.: US 12,602,192 B2

Suzuki      (45) Date of Patent: Apr. 14, 2026

(54) IMAGE FORMING APPARATUS AND CONTROL METHOD

(71) Applicant: BROTHER KOGYO KABUSHIKI KAISHA, Nagoya (JP)

(72) Inventor: Takashi Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 247 days.

(21) Appl. No.: 18/186,123

(22) Filed: Mar. 17, 2023

(65) Prior Publication Data

US 2023/0311533 A1    Oct. 5, 2023

(30) Foreign Application Priority Data

Apr. 1, 2022    (JP) ................................. 2022-062141

(51) Int. Cl.
   *G06F 3/12*      (2006.01)
   *B41J 2/175*      (2006.01)
(52) U.S. Cl.
   CPC ........ *G06F 3/1239* (2013.01); *B41J 2/17546* (2013.01); *B41J 2/17566* (2013.01); *G06F 3/1237* (2013.01); *B41J 2002/17589* (2013.01)
(58) Field of Classification Search
   CPC ................ B41J 2/17566; B41J 2/17546; B41J 2002/17569; B41J 2002/17589; B41J 2002/0052; G06F 3/1237; G06F 3/1239; G06F 3/1224; G06F 3/1218
   See application file for complete search history.

(56) References Cited

U.S. PATENT DOCUMENTS

| | | | | |
|---|---|---|---|---|
| 9,740,152 B2 * | 8/2017 | Jeran | .................. | G03G 15/0867 |
| 2021/0060964 A1 * | 3/2021 | Oguchi | ................ | B41J 2/17546 |
| 2021/0232086 A1 | 7/2021 | Kyotani et al. | | |
| 2021/0306516 A1 | 9/2021 | Yamada | | |
| 2022/0035292 A1 | 2/2022 | Kishimoto | | |

(Continued)

FOREIGN PATENT DOCUMENTS

| | | |
|---|---|---|
| JP | 2008-116623 A | 5/2008 |
| JP | 2021-117468 A | 8/2021 |

(Continued)

*Primary Examiner* — Stephen D Meier
*Assistant Examiner* — Thomas Ray Knief
(74) *Attorney, Agent, or Firm* — Merchant & Gould P.C.

(57) ABSTRACT

A consumable is attachable to a main housing and usable in an image forming apparatus. The consumable contains consumable material. The consumable includes a consumable memory configured to store first remaining amount information. The first remaining amount information indicates a first remaining amount that is a current remaining amount of the consumable material in the consumable. A controller is configured to execute: a first storing process, in a case where the consumable is a contract consumable that is usable when a contract for the image forming apparatus is set, storing a second remaining amount in the consumable memory as the first remaining amount information; and storing a third remaining amount in an apparatus memory. The second remaining amount is a part of the first remaining amount stored in the consumable memory. The third remaining amount is obtained by subtracting the second remaining amount from the first remaining amount.

20 Claims, 8 Drawing Sheets

(56) References Cited

U.S. PATENT DOCUMENTS

| | | |
|---|---|---|
| 2022/0100436 A1 | 3/2022 | Suzuki |
| 2023/0018544 A1 | 1/2023 | Yamamoto |

FOREIGN PATENT DOCUMENTS

| | | |
|---|---|---|
| JP | 2021-160203 A | 10/2021 |
| JP | 2021-164052 A | 10/2021 |
| JP | 2022-25457 A | 2/2022 |

* cited by examiner

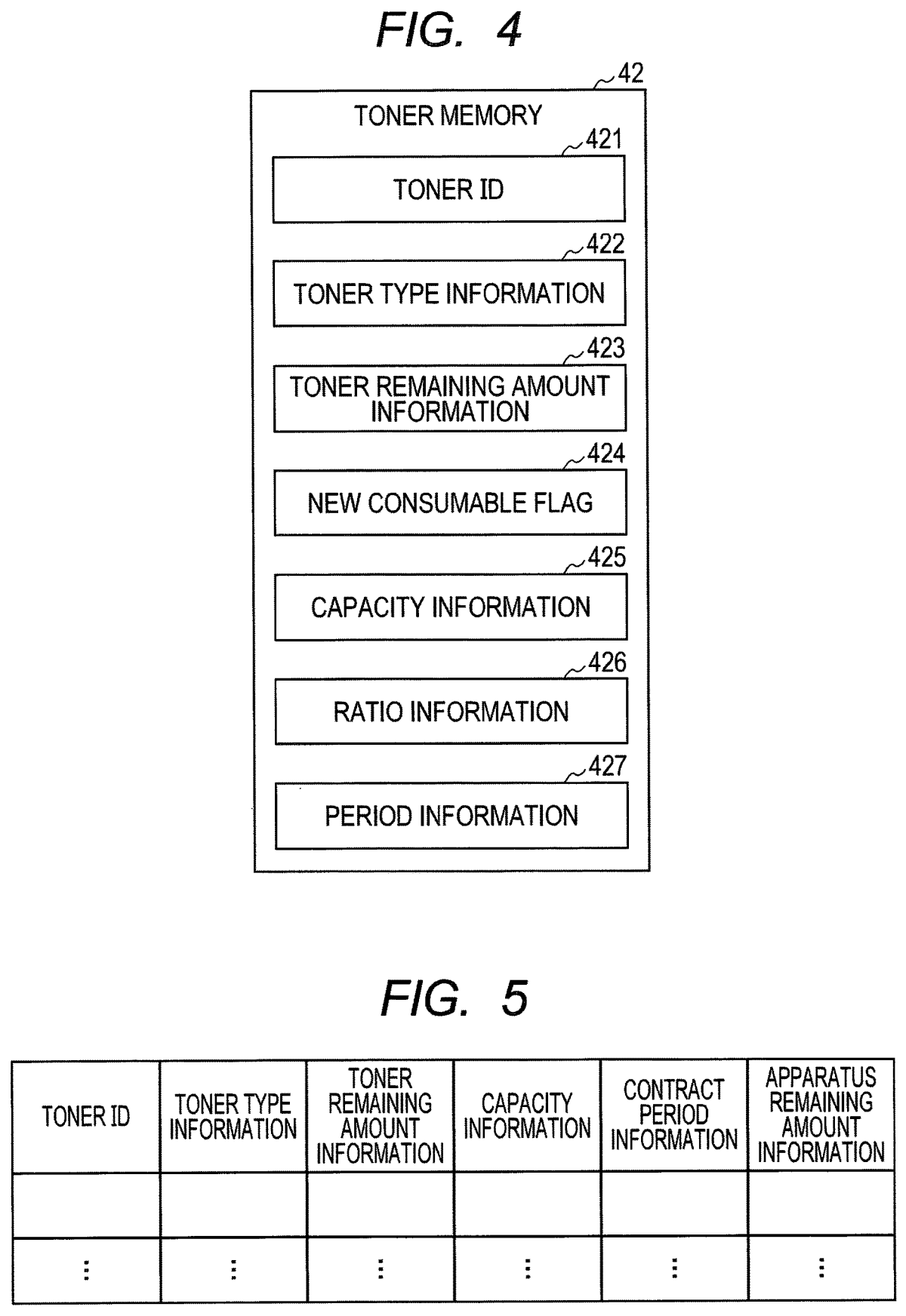

TONER MEMORY

421

TONER ID

422

TONER TYPE INFORMATION

423

TONER REMAINING AMOUNT INFORMATION

424

NEW CONSUMABLE FLAG

425

CAPACITY INFORMATION

426

RATIO INFORMATION

427

PERIOD INFORMATION

FIG. 5

| TONER ID | TONER TYPE INFORMATION | TONER REMAINING AMOUNT INFORMATION | CAPACITY INFORMATION | CONTRACT PERIOD INFORMATION | APPARATUS REMAINING AMOUNT INFORMATION |
|---|---|---|---|---|---|
|  |  |  |  |  |  |
| ⋮ | ⋮ | ⋮ | ⋮ | ⋮ | ⋮ |

CONTRACT CARTRIDGE

BEFORE ATTACHING    AT THE TIME OF ATTACHING

☐ : CARTRIDGE
▨ : APPARATUS

MOVE REMAINING AMOUNT INFORMATION FROM CARTRIDGE TO APPARATUS

W1   W3   W2   W4   W5

BEFORE PARTICULAR PERIOD ELAPSES | AFTER PARTICULAR PERIOD ELAPSES

NORMAL CARTRIDGE

BEFORE ATTACHING    AT THE TIME OF ATTACHING

☐ : CARTRIDGE
▨ : APPARATUS

W1   W6   W7

IMAGE FORMING APPARATUS AND CONTROL METHOD

REFERENCE TO RELATED APPLICATIONS

This application claims priority from Japanese Patent Application No. 2022-062141 filed on Apr. 1, 2022. The entire content of the priority application is incorporated herein by reference.

BACKGROUND ART

As a billing system for using contracted consumables by subscribing to a service, a fixed charge system can be adopted in which a fixed charge is billed to a subscriber for a particular period regardless of the use amount of contracted consumables that are consumables provided to the subscriber.

DESCRIPTION

In general, contracted consumables are only permitted to be used in an image forming apparatus for which a contract is set (made). On the other hand, depending on the situation, it is conceivable that a user may want to use the contracted consumables in an image forming apparatus other than the image forming apparatus for which the contract has been set.

In view of the foregoing, an example of an object of this disclosure is to permit contracted consumables to be used in another image forming apparatus under different conditions from a case where the contracted consumables are used in an image forming apparatus for which a contract is set.

According to one aspect, this specification discloses an image forming apparatus. The image forming apparatus includes a main housing, a consumable, an apparatus memory, and a controller. The consumable is attachable to the main housing and usable in the image forming apparatus. The consumable contains consumable material. The consumable includes a consumable memory configured to store first remaining amount information. The first remaining amount information indicates a first remaining amount that is a current remaining amount of the consumable material in the consumable. The controller is configured to execute: a first storing process, in a case where the consumable is a contract consumable that is usable when a contract for the image forming apparatus is set, storing a second remaining amount in the consumable memory as the first remaining amount information; and storing a third remaining amount in the apparatus memory. The second remaining amount is a part of the first remaining amount stored in the consumable memory. The third remaining amount is obtained by subtracting the second remaining amount from the first remaining amount. By transferring a part of the first remaining amount stored in the consumable memory to the apparatus memory, the controller changes conditions for using the contract consumable in the image forming apparatus. This allows the contract consumable to be used in another image forming apparatus based on the change of the conditions, for example, after a particular period of time has elapsed since the execution of the first storing process.

According to another aspect, this specification also discloses a control method of controlling the image forming apparatus. Further, the image forming apparatus according to each aspect of the present disclosure may be realized by a computer. In this case, a control program for realizing an image forming apparatus with a computer by operating the computer as each part (software element) included in the image forming apparatus and a computer-readable recording medium recording such program are also included in the scope of the present disclosure.

FIG. 4 is a diagram showing an example of the configuration of a toner memory.

FIG. 5 is a diagram showing an example of data structure of toner information stored in an apparatus memory;

An embodiment of the present disclosure will be described below with reference to FIGS. 1 to 10. In this embodiment, as an example, a case where an image forming apparatus 1 is a laser printer and image formation is printing will be described. However, the image forming apparatus may be a printer other than a laser printer. For example, the image forming apparatus 1 may be an inkjet printer.

[Overview of Image Forming System]

Figure 1:
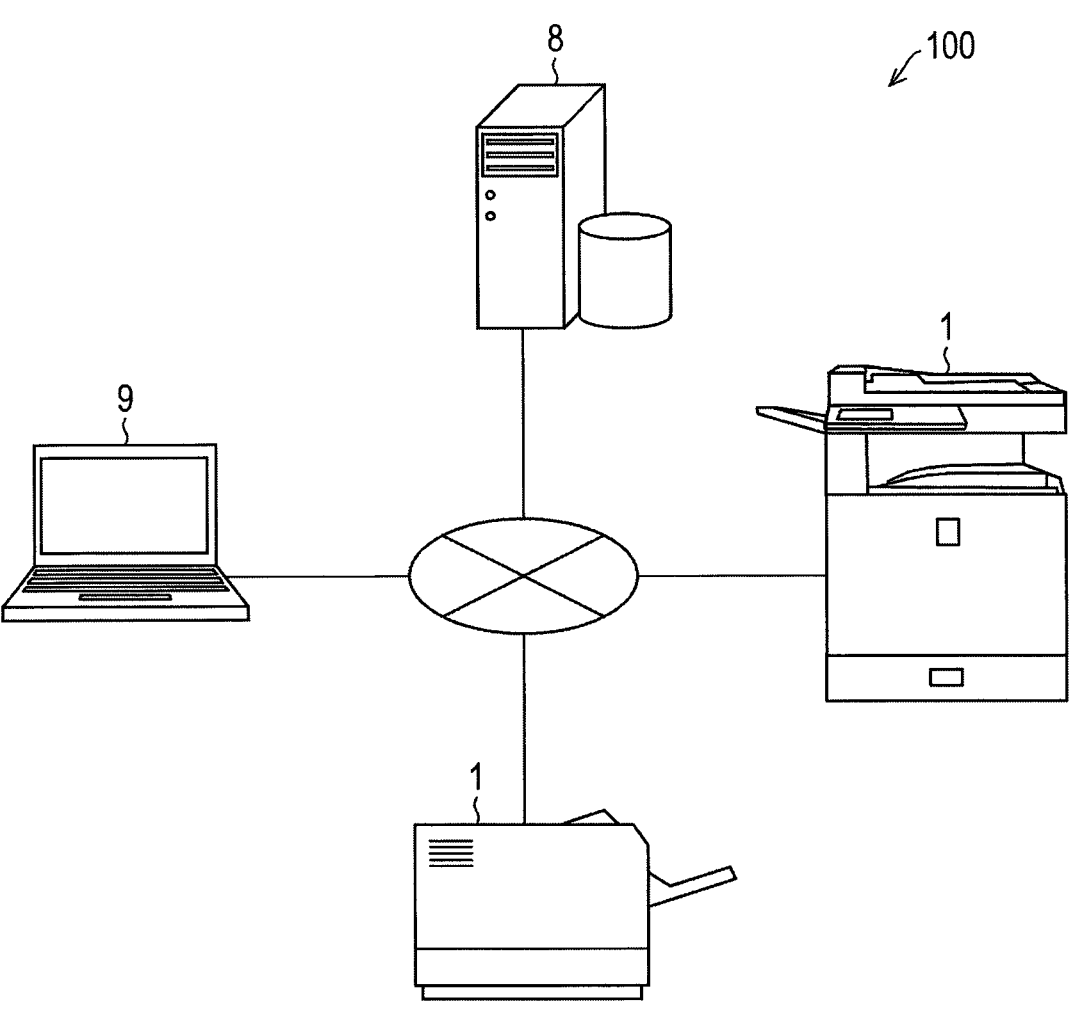
FIG. 1 is a diagram showing an overview of an image forming system.

FIG. 1 shows an overview of an image forming system 100 according to this embodiment.

As shown in FIG. 1, the image forming system 100 includes a plurality of image forming apparatuses 1, a server 8, and a user terminal 9. The plurality of image forming apparatuses 1 shown in FIG. 1 are purchased by the same user. However, although not shown, the image forming system 100 may include still another image forming apparatus purchased by another user.

The image forming apparatus 1 is an apparatus for implementing services provided by a contract for the image forming apparatus 1. The server 8 is an external apparatus that communicates with the image forming apparatus 1 via a network, and is an example of a management apparatus that manages the image forming apparatus 1. In this embodiment, the server 8 is a server managed by a company.

A "contract" in the present embodiment is a contract set between a user and a company, in which the company provides a particular service via the image forming apparatus 1 specified by the user. In other words, it can be said that the user sets (makes) a contract for a certain image forming apparatus 1. Further, it can be said that the image forming apparatus 1 is an apparatus of the target of contract. Hereinafter, the image forming apparatus 1 specified by the user and subject to the contract will be referred to as a "contracted apparatus (contract target apparatus)".

In each of the plurality of image forming apparatuses 1, contract-dedicated consumables are usable when the user sets a contract with the company. As an example, a contract is an agreement between a user and a company that provides a contract service that the company provides the service to the user by setting the period of use of the service, the usage fee, the maximum number of sheets, and so on. That is, the image forming apparatus 1 of the present embodiment is an image forming apparatus that is allowed to, after a service contract is set, perform contract printing which is printing based on the content of the contract.

The user is allowed to register or change the image forming apparatus 1 as a contracted apparatus at any timing. The "registration" referred to here may be new registration or re-registration of an image forming apparatus 1 that has been previously registered and whose contract has been cancelled. Also, the user is allowed to register a plurality of image forming apparatuses 1 as contracted apparatuses. That is, the user can simultaneously use a plurality of image forming apparatuses 1 as contracted apparatuses, or change the image forming apparatus 1 used as a contracted apparatus from one image forming apparatus 1 to another image forming apparatus 1.

The user terminal 9 used by the user is an apparatus for communicating with the server 8 to set and cancel a contract and execute other procedures. The user terminal 9 may be, for example, an information processing terminal having a standard communication function, such as a PC (personal computer) or a smart phone. Each apparatus constituting the image forming system 100 communicates with each other via a communication network such as the Internet.

[Overview of Structure of Image Forming Apparatus 1]

Figure 2:
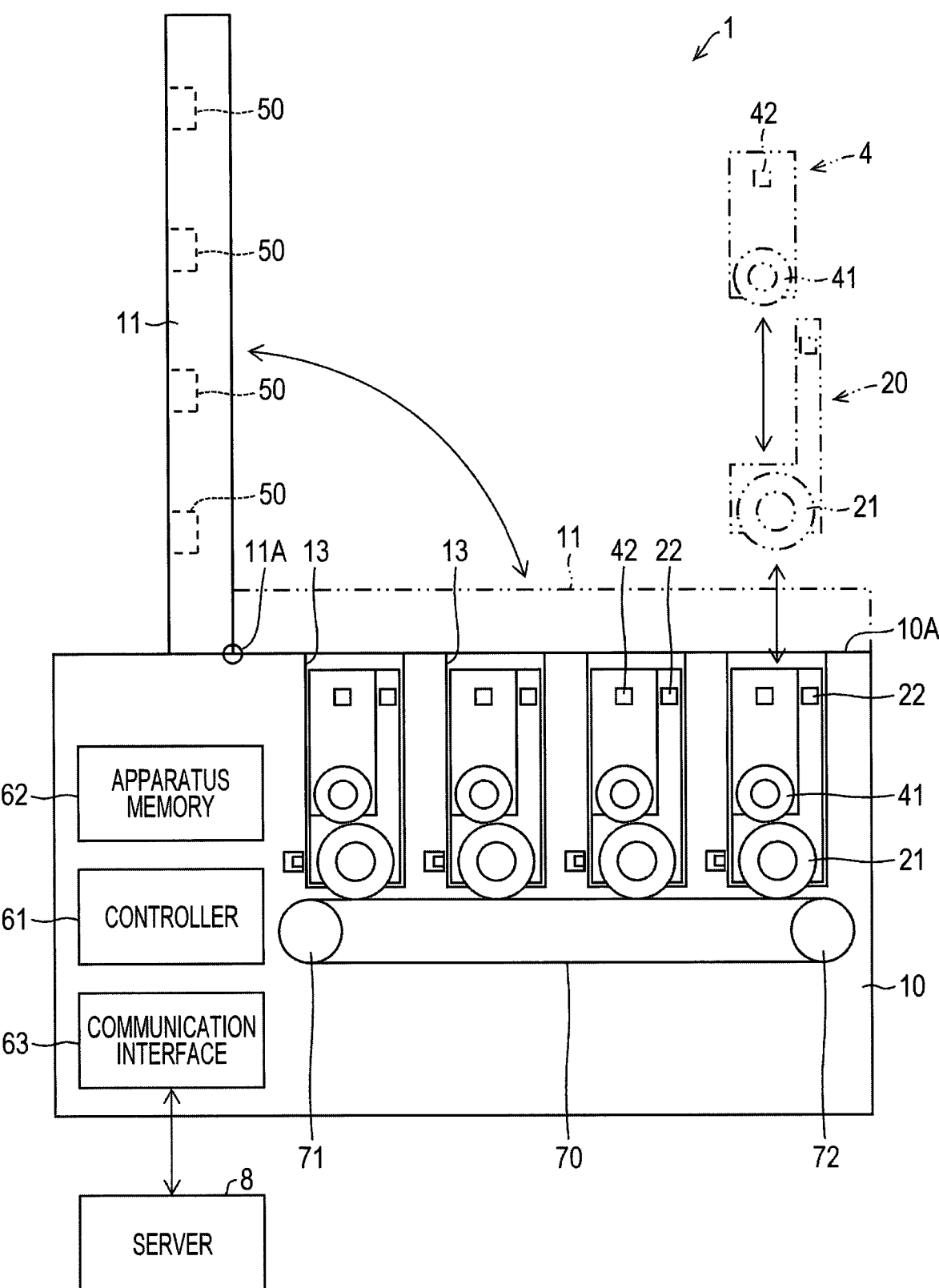
FIG. 2 is a schematic diagram of an image forming apparatus included in the image forming system.
Figure 3:
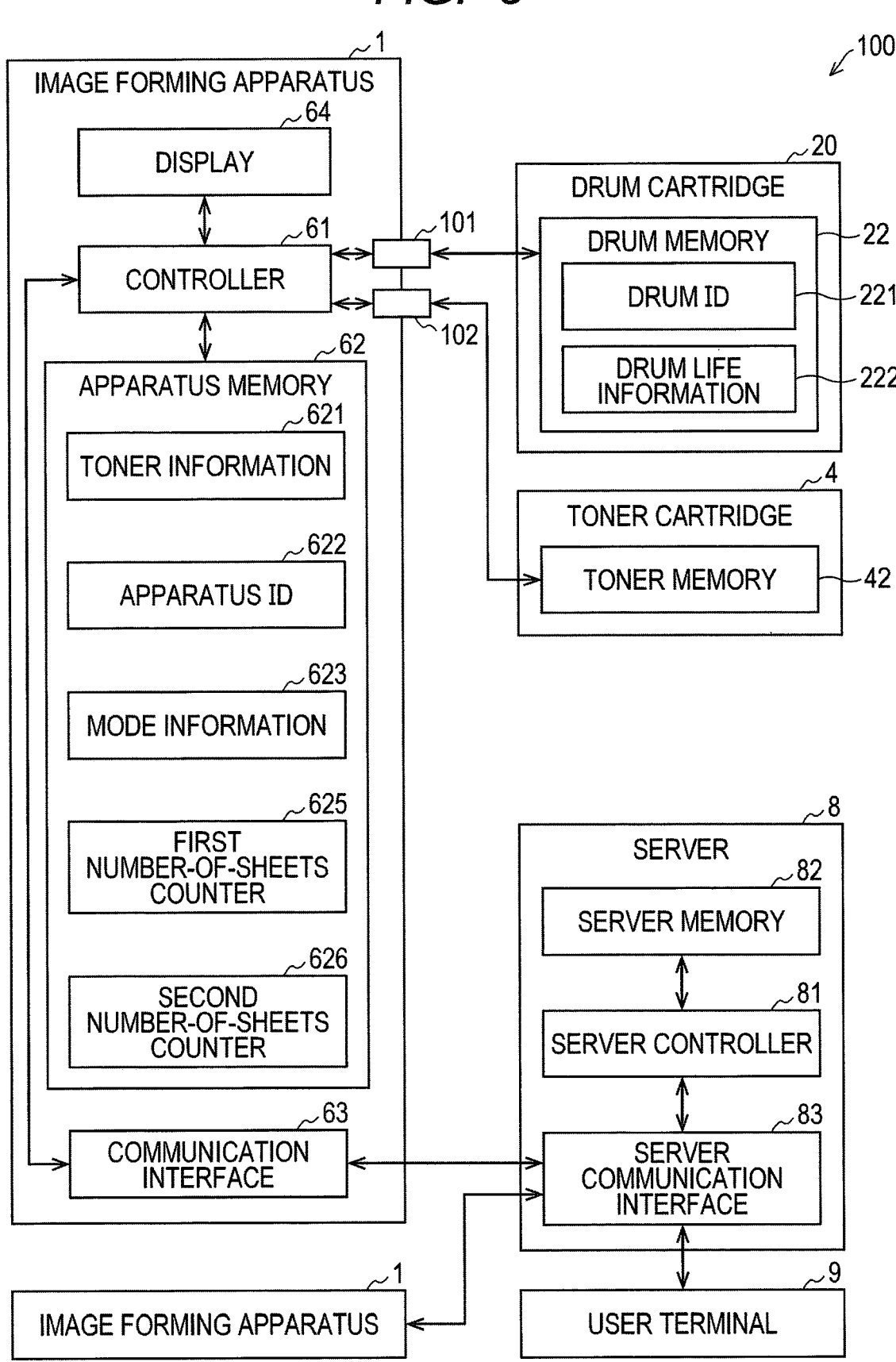
FIG. 3 is a diagram showing internal structures of the image forming apparatus including a drum cartridge and a toner cartridge and a server, and a connection relationship between the image forming apparatus and the server.

FIG. 2 shows a schematic configuration of the image forming apparatus 1. FIG. 3 shows internal structures of the image forming apparatus 1 including drum cartridges 20 and toner cartridges 4 and the server 8, and a connection relationship between the image forming apparatus 1 and the server 8. Although two image forming apparatuses 1 are included in FIG. 3, each image forming apparatus 1 has the same configuration.

As shown in FIG. 2, the image forming apparatus 1 includes a main housing 10 and a cover 11. Although not shown, the image forming apparatus 1 may be provided with a display such as a liquid crystal display or a lamp, and an input interface such as a button. The liquid crystal display may be configured to function as an input interface by being configured integrally with a touch panel.

[Main Housing 10]

In the main housing 10 of the image forming apparatus 1, the toner cartridges 4 are mounted. That is, the toner cartridges 4 are used in the image forming apparatus 1. Although details will be described later, each toner cartridge 4 is integrated with the drum cartridge 20 by being attached to the drum cartridge 20. That is, the toner cartridge 4 is attached to the main housing 10 together with the drum cartridge 20 in a state where the toner cartridge 4 is attached to the drum cartridge 20. In this way, the image forming apparatus 1 including the drum cartridges 20 and the toner cartridges 4 is realized.

In the image forming apparatus 1 of this embodiment, four toner cartridges 4 need to be attached to perform printing. That is, the image forming apparatus 1 of the present embodiment is configured that four drum cartridges 20 and four toner cartridges 4 are attachable. However, the number of drum cartridges 20 and toner cartridges 4 attached to the image forming apparatus 1 is not limited to the example of FIG. 2. For example, the image forming apparatus 1 may be a monochrome printer in which one drum cartridge 20 and one toner cartridge 4 are attachable.

The toner cartridge 4 contains toner that the image forming apparatus 1 consumes during printing. That is, the toner cartridge 4 is a consumable for the image forming apparatus 1. Further, the drum cartridge 20 includes a photosensitive drum 21 used during printing by the image forming apparatus 1. The drum cartridge 20 is also an example of a consumable for the image forming apparatus 1.

The main housing 10 has, for example, a rectangular box shape. The four drum cartridges 20, the four toner cartridges 4, a transfer belt 70, a controller 61, an apparatus memory 62, and a communication interface 63 are accommodated in the main housing 10. The main housing 10 includes four cartridge holding portions 13. The cartridge holding portion 13 is formed in a concave shape and has an opening. The drum cartridge 20 and the toner cartridge 4 are attached to the main housing 10 by being held by the cartridge holding portion 13.

[Cover 11]

The cover 11 of the image forming apparatus 1 is provided with light source units 50 corresponding to respective ones of the drum cartridges 20. That is, the image forming apparatus 1 includes four light source units 50. The cover 11 is pivotable (movable) about a pivot shaft 11A extending in a first direction between an open position that opens the opening 10A indicated by the solid line in FIG. 1 and a closed position that closes the opening 10A indicated by the two-dot chain line in FIG. 2. The pivotal movement of the cover 11 opens and closes the opening 10A provided at an upper end of the main housing 10.

The "first direction" indicates a direction in which a rotation center axis (development axis) of a development roller in a toner cartridge extends. When the cover 11 is arranged at the open position, each opening of the cartridge holding portions 13 is opened. When the cover 11 is arranged at the closed position, each opening of the cartridge holding portions 13 is covered with the cover 11.

The main housing 10 may be provided with a close sensor (not shown) at the opening 10A. The close sensor is a sensor that detects that the cover 11 is in the closed position. The close sensor may be, for example, a contact sensor or an optical sensor.

[Toner Cartridge 4]

The toner cartridge 4 includes a cartridge housing for accommodating the development roller 41 and developer (for example, toner) as an example of consumable material. The cartridge housing is attachable to the main housing 10. The four toner cartridges 4 contain developers of different colors (for example, cyan, magenta, yellow, and black) as materials used for image formation. The developer is consumable material that decreases with use. The developing roller 41 is a cylindrical member extending in the first direction, and is rotatable around a development shaft extending in the first direction. When the toner cartridge 4 is attached to the drum cartridge 20, the outer peripheral surface of the photosensitive drum 21 comes into contact with the outer peripheral surface of the development roller 41.

The toner cartridge 4 also includes a toner memory 42 as an example of a consumable memory. The toner memory 42 is arranged on the outer surface of one side of the toner cartridge 4 in the first direction. The toner memory 42 is a memory from which information is read and to which information is written, such as a flash ROM (Read Only Memory) or an EEPROM (Electronically Erasable and Programmable Read Only Memory).

FIG. 4 shows an example of the configuration of the toner memory 42. As shown in FIG. 4, the toner memory 42 includes a first area 421, a second area 422, a third area 423, a fourth area 424, a fifth area 425, a sixth area 426, and a seventh area 427 in order to store information about the toner cartridge 4. The toner memory 42 stores a toner ID in the first area 421. The toner memory 42 stores toner type information as an example of type information in the second area 422. The toner memory 42 stores toner remaining amount information in the third area 423.

The toner memory 42 stores a new consumable flag in the fourth area 424. The toner memory 42 stores capacity information in the fifth area 425. The toner memory 42 stores ratio information in the sixth area 426. The toner memory 42 stores period information in the seventh area 427. The third area 423 and the fourth area 424 may be rewritable with data.

The toner ID is, for example, unique identification information for identifying each toner cartridge 4. The toner ID may be a unique serial number of each toner cartridge 4. The toner ID may include information indicating the color of each toner cartridge 4.

The toner type information is an example of type information representing the type of the toner cartridge 4. In this embodiment, there are two types of toner cartridges 4. One is a "contract cartridge (contract-dedicated cartridge)" that is usable only with a contracted apparatus. In other words, the contract cartridge is an example of a contract consumable that is usable when a contract for the image forming apparatus 1 is set.

The other is a "normal cartridge" that is usable even with the image forming apparatus 1 that is not a contracted apparatus. In other words, the normal cartridge is an example of normal consumables that is usable regardless of existence of a contract. The toner type information may be included in the toner ID. That is, the toner ID may include information identifying each toner cartridge 4 and information indicating the type of each toner cartridge 4.

The toner remaining amount information is information indicating the remaining amount of toner in the toner cartridge 4. The remaining amount of toner includes, for example, a value corresponding to one of a plurality of stages from full to empty, and the value is stored in the third area 423. Each stage of the remaining amount of toner stored in the toner memory 42 may be a character string such as "FULL" to "EMPTY", or a numerical value "100%" to "0%", or information combining a character string and a numerical value, based on the values described above. Here, "empty" means not only a state where the remaining amount of toner is completely zero, but also a state where the remaining amount of toner is smaller than a particular amount close to zero.

In this embodiment, the toner remaining amount information is information indicating the remaining amount of toner distributed to the toner cartridge 4 side assuming that the remaining amount of toner contained in the toner cartridge 4 attached to the image forming apparatus 1 is virtually distributed between the toner cartridge 4 and the main housing 10.

The new consumable flag is an example of status information indicating that the toner cartridge 4 is a new consumable or a used consumable (old consumable). For example, a value of "1" for the new consumable flag may mean that the toner cartridge 4 is a new consumable, and a value of "0" for the new consumable flag may mean that the toner cartridge 4 is a used consumable.

The capacity information is information representing the capacity of toner that can be contained in the toner cartridge 4. In this embodiment, as an example, the toner cartridges 4 may have three stages of capacities. More specifically, the capacities that are set for the toner cartridges 4 are three levels of "small capacity", "standard capacity", and "large capacity" in ascending order. The capacity information indicates one of these capacities.

The ratio information includes first ratio information, second ratio information, and third ratio information. The first ratio information is the information that represents a ratio between a remaining amount of toner stored in the toner memory 42 and a remaining amount of toner stored in the apparatus memory 62 of the image forming apparatus 1 when the toner cartridge 4 as a contract cartridge is attached to the main housing 10. The second ratio information is information representing a ratio between a remaining amount of toner stored in the toner memory 42 and a remaining amount of toner stored in the apparatus memory 62 when the toner cartridge 4 as a normal cartridge is attached to the main housing 10. The third ratio information is information representing a ratio of a remaining amount of toner stored in the toner memory 42 to a remaining amount of toner stored in the apparatus memory 62 after a particular period of time has elapsed. The particular period indicates a period during which the manufacturer of the contract cartridge collects the cost of the contract cartridge.

The ratio information may not be stored in the sixth area 426 of the toner memory 42 but may be stored in the apparatus memory 62 in advance. Alternatively, the remaining amount of toner to be stored in each of the toner memory 42 and the apparatus memory 62 when the toner cartridge 4 is attached to the main housing 10 after a particular period of time has elapsed may be stored in advance instead of the ratio information.

The period information is information representing the particular period described above. The period information may not be stored in the toner memory 42. In this case, the toner memory 42 may not include the seventh area 427.

[Drum Cartridge 20]

The drum cartridge 20 includes a cartridge housing that is attachable to the main housing 10. The cartridge housing includes a photosensitive drum 21 as a component used for image formation. The photosensitive drum 21 is a replacement part that needs to be replaced because deterioration such as wear of the surface occurs with use. The photosensitive drum 21 is a cylindrical photoreceptor extending in the first direction. The photosensitive drum 21 is rotatable around a drum shaft extending in the first direction. The outer peripheral surface of the photosensitive drum 21 is covered with a photosensitive material.

The drum cartridge 20 may also include a drum memory 22. The drum memory 22 is a memory from which information is read and to which information is written. The drum memory 22 is, for example, a flash ROM or an EEPROM.

The drum memory 22 includes a first area 221 and a second area 222 for storing information regarding the photosensitive drum 21 of the drum cartridge 20. The drum memory 22 may store a drum ID in the first area 221. The drum memory 22 may store drum life information in the second area 222. The drum ID is a unique serial number for identifying each drum cartridge 20. The drum life information is information indicating the life of the photosensitive drum 21.

[Attachment of Cartridge and Printing Mechanism]

As shown in FIG. 2, the drum cartridges 20 and the toner cartridges 4 are attached in the main housing 10 in a state where the cover 11 is located at the open position. In this state, the drum cartridges 20 and the toner cartridges 4 are inserted into the cartridge holding portions 13 through the opening 10A.

The main housing 10 includes connectors 101 and 102. When the connector 101 is electrically connected to the drum memory 22 in a state where the drum cartridge 20 is inserted in the cartridge holding portion 13, the controller 61 of the main housing 10 communicates with the drum memory 22 of the drum cartridge 20. When the connector 102 is electrically connected to the toner memory 42 in a state where the toner cartridge 4 is attached to the main housing 10, the controller 61 of the main housing 10 communicates with the toner memory 42 of the toner cartridge 4.

The four light source units 50 are attached to the inner surface of the cover 11. Each light source unit 50 is arranged to face the surface of the photosensitive drum 21 in a state where the drum cartridge 20 is attached to the main housing 10 and the cover 11 is located at the closed position. The light source unit 50 includes a plurality of light sources arranged in the first direction. The light sources irradiate the outer peripheral surface of the photosensitive drum 21 with light. The light sources are, for example, LEDs (Light Emitting Diodes).

The light source unit 50 is electrically connected to the controller 61. The controller 61 causes the plurality of light sources of the light source unit 50 to emit light according to input image data. The light source irradiates light toward the outer peripheral surface of the photosensitive drum 21. As a result, the photosensitive material on the outer peripheral surface of the photosensitive drum 21 is exposed according to the image data.

The transfer belt 70 is a component that transfers developer (for example, toner) on the surface of the photosensitive drum 21 to printing paper. The transfer belt 70 is a replacement part that needs to be replaced due to wear of its surface and other deterioration as it is used. The transfer belt 70 is a belt configured to contact the photosensitive drum 21 and has an annular shape (endless belt). The outer peripheral surface of the photosensitive drum 21 is configured to contact the outer peripheral surface of the transfer belt 70. During a printing process, printing paper is conveyed between the transfer belt 70 and the photosensitive drums 21.

The transfer belt 70 is stretched between a drive roller 71 and a follow roller 72. The drive roller 71 drives the transfer belt 70. The controller 61 causes the drive roller 71 to rotate. The follow roller 72 rotates by following movement of the transfer belt 70 due to driving of the drive roller 71.

[Internal Structure of Main Housing]

The controller 61 includes, for example, an ASIC (Application Specific Integrated Circuit). The controller 61 is electrically connected to each of the apparatus memory 62 provided in the main housing 10 and the communication interface 63. The controller 61 causes the image forming apparatus 1 to perform a printing process and associated processes by executing various types of processing.

The controller 61 may include a processor such as a CPU (Central Processing Unit). In this case, the apparatus memory 62 may store a control program for implementing a print control method. And, the processor of the controller 61 may operate according to the control program stored in the apparatus memory 62 to execute the printing process in the image forming apparatus 1.

The controller 61 itself may include a computer-readable recording medium storing a control program. As a recording medium, a "non-temporary tangible medium" such as a ROM (Read Only Memory), a tape, a disk, a card, a semiconductor memory, a programmable logic circuit, and so on may be used. Further, a RAM (Random Access Memory) for expanding the control program may be used as the recording medium.

The control program may be supplied to the computer via any transmission medium (communication network, broadcast wave, and so on) capable of transmitting the control program. It should be noted that one aspect of the present disclosure may also be embodied in the form of a data signal embedded in a carrier wave in which the control program is embodied by electronic transmission.

When the drum cartridge 20 and the toner cartridge 4 are attached to the cartridge holding portion 13 of the main housing 10, the drum memory 22 and the toner memory 42 are electrically connected to the controller 61 as shown in FIG. 3. The controller 61 performs reading information from the connected drum memory 22 and toner memory 42 and writing and/or rewriting information to the drum memory 22 and toner memory 42.

The apparatus memory 62 is a memory from which information is read and to which information is written. The apparatus memory 62 is, for example, a flash ROM or an EEPROM. The apparatus memory 62 includes an area 621 for storing toner information, an area 622 for storing an apparatus ID, an area 623 for storing mode information, an area 625 for storing a first number-of-sheets counter, and an area 626 for storing a second number-of-sheets counter.

The toner information is information on each toner cartridge 4 attached to the image forming apparatus 1. FIG. 5 shows an example of a data structure of the toner information stored in the apparatus memory 62.

As shown in FIG. 5, the toner information may be, for example, data in which the toner ID read from a certain toner memory 42 is associated with the toner type information, the toner remaining amount information, the capacity information, and the (contract) period information read from the same toner memory 42. Further, the toner information may be data in which the toner ID read from a certain toner memory 42 is associated with apparatus remaining amount information. The apparatus memory 62 may store, in the area 621, the data associated in this way for each toner cartridge 4.

The apparatus remaining amount information is information indicating the remaining amount of toner distributed to the main housing 10 side assuming that the remaining amount of toner contained in the toner cartridge 4 attached to the image forming apparatus 1 is virtually distributed between the toner cartridge 4 and the main housing 10. Thus, the total value of the toner remaining amount indicated by the toner remaining amount information stored in the toner memory 42 and the toner remaining amount indicated by the apparatus remaining amount information stored in the apparatus memory 62 equals to the remaining amount of toner that is usable by the image forming apparatus 1 to which the toner cartridge 4 is attached. The initial value of the apparatus remaining amount information may be 0.

The apparatus ID is identification information for identifying the image forming apparatus 1. The apparatus ID may be a serial number of the image forming apparatus 1, for example.

The mode information is information indicating an operation mode of the image forming apparatus 1. In the present embodiment, it is assumed that the mode information is one of two modes including "contract mode" which means that the image forming apparatus 1 is registered as a contracted apparatus, and "normal mode" which means that the image forming apparatus 1 is not registered as a contracted apparatus or a contract has been canceled. When the image forming apparatus 1 is shipped, a value corresponding to the normal mode is stored in the area 623 as an initial value. The controller 61 appropriately rewrites (changes) the mode information.

A first number-of-sheets counter may be stored in the area 625. The first number-of-sheets counter is the total number of printed sheets in the image forming apparatus 1. A second number-of-sheets counter may be stored in the area 626. The second number-of-sheets counter indicates the number of printed sheets printed by the image forming apparatus 1 under contract printing (printing on a contract basis). The second number-of-sheets counter may be reset to 0 each time the image forming apparatus 1 shifts from the contract mode to the normal mode, or may also be the total number of printed sheets that have been printed under contract printing in the image forming apparatus 1 so far.

The communication interface 63 is a communication interface that performs communication between the image forming apparatus 1 and the server 8. The communication interface 63 outputs various data, notifications, and requests received from the server 8 to the controller 61. The communication interface 63 transmits various data, notifications, and requests input from the controller 61 to the server 8.

[User Terminal 9]

The user terminal 9 includes an input interface for accepting various user input operations and a communication interface for communicating with the server 8. The user registers a contracted apparatus in the server 8 by performing an input operation via the user terminal 9. For example, the user inputs, to the user terminal 9, his/her own identification information and the identification information of the image forming apparatus 1 to be contracted. Upon receiving the input, the user terminal 9 transmits the input information to the server 8.

The user terminal 9 may accept an input operation related to changing the contracted apparatus in addition to registering the contracted apparatus (that is, adding the contracted apparatus). For example, the user terminal 9 may accept a user's input operation for inputting the user's own identification information, the identification information of the contracted apparatus after a contract change, and the identification information of the contracted apparatus before the contract change. Then, these three types of information may be transmitted to the server 8. Further, when the user inputs print data such as text or diagrams via the user terminal 9, the user terminal 9 outputs a print instruction to the image forming apparatus 1 according to the input print data, thereby printing the print data.

[Server 8]

The server 8 is a management apparatus that manages the operating state of the image forming apparatus 1. The server 8 includes a server communication interface 83, a server memory 82, and a server controller 81. The server controller 81 is a CPU that controls overall operations of the server 8. The server memory 82 is a storage device that stores data necessary for the server 8 to operate.

The server controller 81 updates a registration table stored in the server memory 82 in accordance with a notification or request received from the image forming apparatus 1. The "registration table" is a data table in which the image forming apparatuses 1 designated as contracted apparatuses by the users or by the server 8 are registered. The "registration table" also includes data indicating whether a contract is currently valid (not canceled) for each contracted apparatus.

The server memory 82 may have an area for storing apparatus information and an area for storing the registration table. The server controller 81 may store the apparatus information or update the registration table in response to a notification or request received from the image forming apparatus 1 or the user terminal 9. The apparatus information is data in which various types of information regarding the image forming apparatus 1 are collected. The apparatus information is stored separately for each image forming apparatus 1. The apparatus information includes at least an apparatus ID. In addition, the apparatus information may include a value of the first number-of-sheets counter and/or a value of the second number-of-sheets counter.

The server communication interface 83 is a communication interface that performs communication between the server 8 and the image forming apparatus 1. The server communication interface 83 outputs various data, notifications, and requests received from the image forming apparatus 1 or the user terminal 9 to the server controller 81. The server communication interface 83 transmits various data, notifications, and requests input from the server controller 81 to the image forming apparatus 1 or the user terminal 9.

For example, the server communication interface 83 receives the apparatus ID, the toner ID of the toner cartridge 4, the toner type information, the toner remaining amount information, and the new consumable flag from the image forming apparatus 1, and may output the same to the server controller 81. The server controller 81 may store, in the server memory 82, the input apparatus ID, the toner ID of the toner cartridge 4, the toner type information, the toner remaining amount information, and the new consumable flag in association with one another as the apparatus information of the image forming apparatus 1.

[Processing Flow of Image Forming Apparatus]

Next, a processing flow executed by the controller 61 of the image forming apparatus 1 will be described. It is assumed on the premise that a contract has been set for the image forming apparatus 1. That is, the mode information of the apparatus memory 62 is assumed to indicate "contract mode". The processing flow executed by the controller 61 will be described by using one toner cartridge 4 in four toner cartridges 4 attached to the main housing 10 as an example.

[Processing Flow when Toner Cartridge is Attached to Image Forming Apparatus]

First, one example of a first calculation process executed by the controller 61 of the image forming apparatus 1 when the toner cartridge 4 is attached to the main housing 10 will be described based on FIG. 6, FIG. 9, and FIG. 10.

Figure 6:
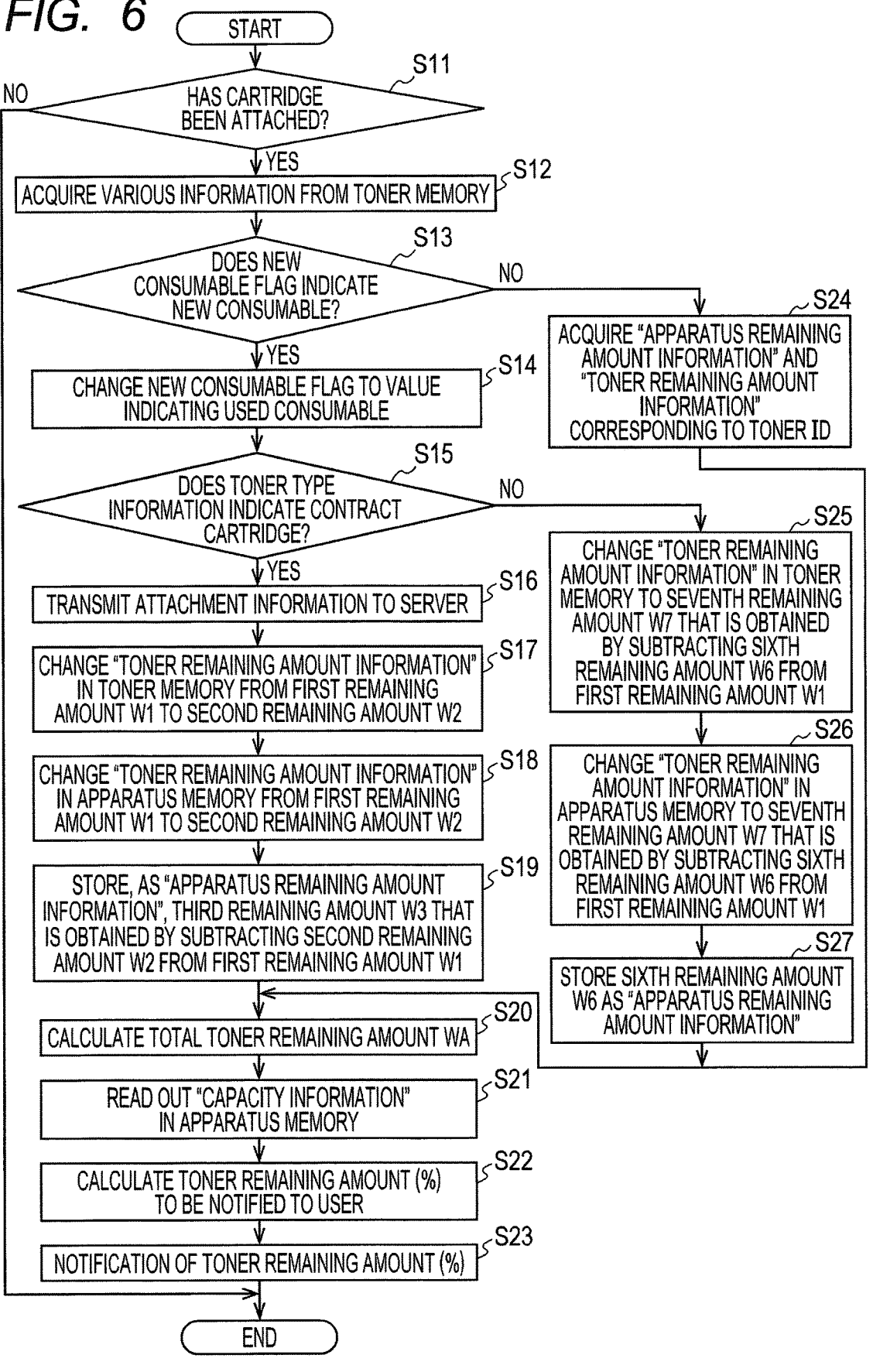
FIG. 6 is a flowchart showing an example of a first calculation process executed by the image forming apparatus when a toner cartridge is attached.

FIG. 6 illustrates an example of the first calculation process executed by the controller 61 when the toner cartridge 4 is attached to the main housing 10. The first calculation process is processing in which the controller 61 calculates the toner remaining amount information to be stored in the toner memory 42 and the apparatus memory 62 and the apparatus remaining amount information to be stored in the apparatus memory 62 when the toner cartridge 4 is attached to the apparatus housing 10. The processing shown in FIG. 6 is processing that the controller 61 executes every particular period, for example, an interval of several milliseconds to several tens of milliseconds after the power switch (not shown) is set to ON.

Figure 9:
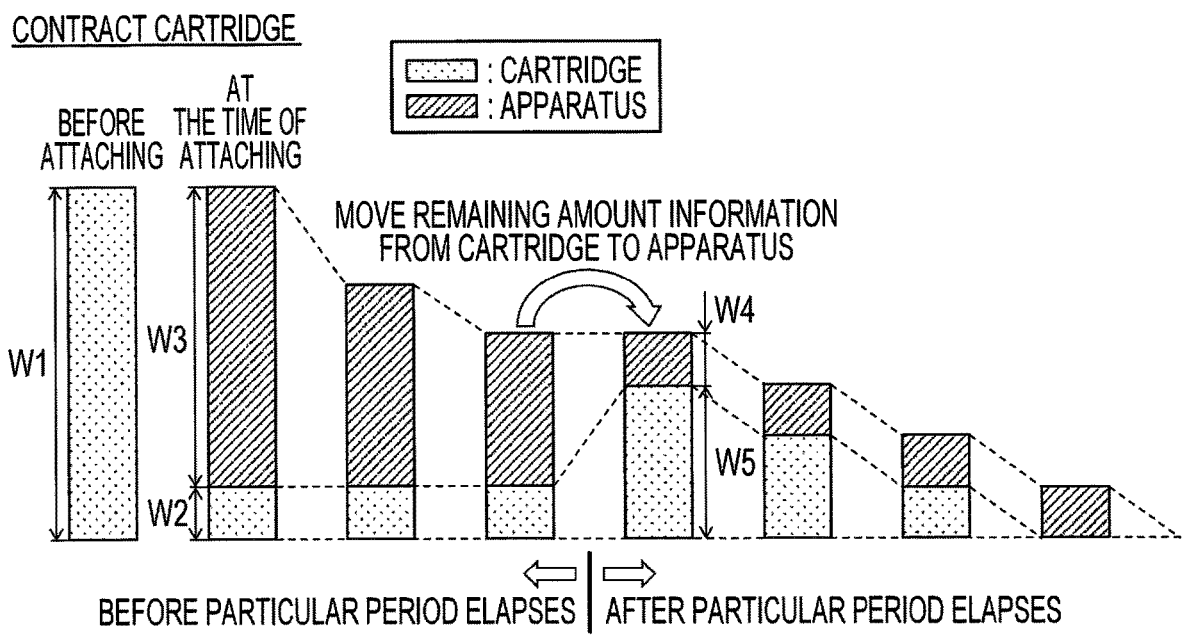
FIG. 9 is an explanatory diagram showing an example of change over time of apparatus remaining amount information stored in the apparatus memory and toner remaining amount information stored in the toner memory after a contract cartridge is attached to a main housing of the image forming apparatus.

FIG. 9 explains an example of a chronological change of the apparatus remaining amount information stored in the apparatus memory 62 and the toner remaining amount information stored in the toner memory 42 after the toner cartridge 4 as a contract cartridge is attached to the main housing 10 of the image forming apparatus 1. FIG. 10 explains an example of a chronological change of the apparatus remaining amount information stored in the apparatus memory 62 and the toner remaining amount information stored in the toner memory 42 after the toner cartridge 4 as a normal cartridge is attached to the main housing 10 of the image forming apparatus 1.

As shown in FIG. 6, in S11, the controller 61 first determines whether a new toner cartridge 4 has been attached to the main housing 10. Specifically, the controller 61 reads the toner ID from the toner memory 42 of the toner cartridge 4. The controller 61 compares the toner ID read from the toner memory 42 with a latest toner ID stored in the area 621 of the apparatus memory 62.

When the toner ID read from each toner memory 42 is the same as the latest toner ID stored in the area 621, the controller 61 determines that no new toner cartridge 4 has been attached to the main housing 10. In response to determining that no new toner cartridge 4 has been attached to the main housing 10, that is, when it is NO in S11, the controller 61 ends the first calculation process.

When the toner ID read from the toner memory 42 is different from the latest toner ID stored in the area 621, the controller 61 determines that a new toner cartridge 4 has been attached to the main housing 10. In response to determining that a new toner cartridge 4 has been attached to the main housing 10, that is, when it is YES in S11, the controller 61 proceeds the processing to S12.

In S12, the controller 61 reads various types of information from the toner memory 42. That is, the controller 61 reads the toner ID, the toner type information, the toner remaining amount information, the new consumable flag, and the capacity information from the toner memory 42. The controller 61 stores the toner type information, the toner remaining amount information, the new consumable flag, and the capacity information in association with the toner ID in the apparatus memory 62.

In S13, the controller 61 executes a second determination process determining whether the new consumable flag read from the toner memory 42 in S12 is information indicating that the toner cartridge 4 is a "new consumable". In response to determining that the new consumable flag is the information indicating that the toner cartridge 4 is the "new consumable", the controller 61 proceeds from YES in S13 to S14. In S14, the controller 61 rewrites (changes) the new consumable flag of the toner memory 42 to information indicating that the toner cartridge 4 is a "used consumable".

In S15, the controller 61 executes a first determination process determining whether the toner type information read in S12 is the information indicating that the toner cartridge 4 is the "contract cartridge". That is, the controller 61 determines whether the contract cartridge has been newly attached to the main housing 10. In response to determining that the toner type information is the information indicating the "contract cartridge", the controller 61 proceeds from YES in S15 to S16.

In S16, the controller 61 transmits, to the server 8, attachment information indicating that the toner cartridge 4 has been attached to the main housing 10 in S11. By receiving the attachment information, the server 8 recognizes the timing when the use of the toner cartridge 4 is started in the image forming apparatus 1. Thus, when the server 8 receives the attachment information, the server 8 starts measurement of time from the start of use of the toner cartridge 4 until a particular period elapses.

In S17, the controller 61 rewrites (changes) the toner remaining amount information of the toner memory 42 from a first remaining amount W1 to a second remaining amount W2. In other words, the controller 61 stores the second remaining amount W2 in the toner memory 42 as the toner remaining amount information of the toner memory 42. The toner remaining amount information may be an example of the first remaining amount information indicating the first remaining amount W1 to be rewritten (changed) to the second remaining amount W2.

The first remaining amount W1 is a current remaining amount of the toner contained in the toner cartridge 4. For example, the first remaining amount W1 may be a remaining amount of the toner contained in the toner cartridge 4 at a point of time when the toner cartridge 4 is attached to the main housing 10. In the case of a new toner cartridge 4, the first remaining amount W1 may be a toner amount contained at manufacture of the toner cartridge 4.

The second remaining amount W2 is a part of the first remaining amount W1. For example, the second remaining amount W2 may be set in advance and may be stored in the apparatus memory 62 or the toner memory 42. For example, the controller 61 may calculate the second remaining amount W2 by multiplying the first remaining amount W1 by a ratio indicated by first ratio information stored in the toner memory 42. In this case, the controller 61 may read the first ratio information from the toner memory 42 in S12.

In S18, the controller 61 rewrites (changes) the toner remaining amount information of the apparatus memory 62 from the first remaining amount W1 to the second remaining amount W2. As a result, the toner remaining amount information of the toner memory 42 is managed also in the apparatus memory 62.

In S19, the controller 61 stores, in the apparatus memory 62, a third remaining amount W3 as the apparatus remaining amount information of the apparatus memory 62. The third remaining amount W3 is obtained by subtracting the second remaining amount W2 from the first remaining amount W1. The processing in S17 and S19 is an example of a first storing process.

By executing the first storing process in S17 and S19, the controller 61 changes the toner remaining amount information of the contract cartridge whose use is allowed only in the image forming apparatus 1 registered as a contracted apparatus. That is, the controller 61 changes a condition of the contract cartridge used in the image forming apparatus 1 registered as the contracted apparatus. Thus, the controller 61 brings about a state where the use of the toner cartridge 4 as the contract cartridge in another image forming apparatus is allowed. Another image forming apparatus described above may be (1) an image forming apparatus registered as the contracted apparatus or (2) an image forming apparatus not registered as the contracted apparatus.

In S19 executed in a case where the toner cartridge 4 is the contract cartridge, the controller 61 subtracts the second remaining amount W2 from the first remaining amount W1 such that the third remaining amount W3 becomes larger than the second remaining amount W2. That is, the second remaining amount W2 or the ratio indicated by the first ratio information is set such that the third remaining amount W3 is larger than the second remaining amount W2. The second remaining amount W2 may be a value "0" corresponding to "EMPTY" or a value close to a state of the "EMPTY", for example.

As shown in FIG. 9, for example, before a new toner cartridge 4, which is the contract cartridge, is attached to the main housing 10, the toner memory 42 of the new toner cartridge 4 stores the "first remaining amount W1" as the toner remaining amount information. When the toner cartridge 4 is attached to the main housing 10, the controller 61 rewrites (changes) the toner remaining amount information of the toner memory 42 from the "first remaining amount W1" to the "second remaining amount W2". The second remaining amount W2 is a value corresponding to the "EMPTY" or a value close to a state of the "EMPTY".

The controller 61 stores the "second remaining amount W2" in the apparatus memory 62 as the toner remaining amount information. The "second remaining amount W2" is the toner remaining amount information stored in the toner memory 42 of the toner cartridge 4 attached to the main housing 10. The controller 61 stores, in the apparatus memory 62, that the "second remaining amount W2" corresponds to the toner ID stored in the toner memory 42 of the toner cartridge 4 attached to the main housing 10. The controller 61 rewrites (changes) the "first remaining amount W1" stored in the apparatus memory 62 as the apparatus remaining amount information to the "third remaining amount W3". The "third remaining amount W3" is a value obtained by subtracting the "second remaining amount W2" from the "first remaining amount W1".

In this embodiment, the controller 61 brings about the state where the use of the toner cartridge 4 in another image forming apparatus is allowed by rewriting the toner remaining amount information from the second remaining amount W2 to a fifth remaining amount W5 after elapse of a particular period as will be described later. In other words, the use of the toner cartridge 4 in another image forming apparatus is limited until the controller 61 rewrites (changes) the toner remaining amount information from the second remaining amount W2 to the fifth remaining amount W5 after the elapse of the particular period.

Thus, the controller 61 limits the use of the contract cartridge in another image forming apparatus before recovering the cost of the contract cartridge. The controller 61 allows the use of the contract cartridge in another image forming apparatus after recovering the cost of the contract cartridge. This improves usability of the contract cartridge while recovering the cost of the contract cartridge.

In S20, the controller 61 reads the toner remaining amount information and the apparatus remaining amount information from the apparatus memory 62. The controller 61 then calculates a total toner remaining amount WA by adding the third remaining amount W3 indicated by the apparatus remaining amount information to the second remaining amount W2 indicated by the toner remaining amount information.

In S21, the controller 61 reads out the capacity information in the apparatus memory 62. In S22, the controller 61 calculates the toner remaining amount to be notified to the user based on the capacity information read in S21. The controller 61 calculates the toner remaining amount expressed in percentage by dividing the total toner remaining amount WA by a capacity value indicated by the read capacity information and multiplying the divided value by 100. In S23, the controller 61 displays the toner remaining amount calculated in S22 on the display 64. Then, the controller 61 ends the first calculation process.

In response to determining in S15 that the toner type information read in S12 is not the information indicating the "contract cartridge", the controller 61 proceeds from NO in S15 to S25. That is, in response to determining that the toner type information read in S12 is the information indicating the "normal cartridge", the controller 61 proceeds from NO in S15 to S25.

In S25, the controller 61 rewrites (changes) the toner remaining amount information of the toner memory 42 to a seventh remaining amount W7 that is obtained by subtracting a sixth remaining amount W6 from the first remaining amount W1. In other words, the controller 61 stores the seventh remaining amount W7 in the toner memory 42 as the toner remaining amount information of the toner memory 42. In S26, the controller 61 rewrites (changes) the toner remaining amount information of the apparatus memory 62 to the seventh remaining amount W7.

The sixth remaining amount W6 is a part of the first remaining amount W1. For example, the sixth remaining amount W6 may be set in advance and may be stored in the apparatus memory 62 or the toner memory 42. For example, the controller 61 may calculate the sixth remaining amount W6 by multiplying the first remaining amount W1 by a ratio indicated by second ratio information stored in the toner memory 42. In this case, the controller 61 may read the second ratio information from the toner memory 42 in S12.

In S27, the controller 61 stores the sixth remaining amount W6 in the apparatus memory 62 as the apparatus remaining amount information of the apparatus memory 62. The processing in S25 and S27 are an example of a third storing process.

In S25 executed in a case where the toner cartridge 4 is a normal cartridge, the controller 61 subtracts the sixth remaining amount W6 from the first remaining amount W1 such that the seventh remaining amount W7 becomes larger than the sixth remaining amount W6. That is, the sixth remaining amount W6 or the ratio indicated by the second ratio information is set such that the seventh remaining amount W7 becomes larger than the sixth remaining amount W6. For example, the sixth remaining amount W6 may be a value close to the state of "EMPTY". In this case, the seventh remaining amount W7 is a value close to the state of "FULL".

Figure 10:
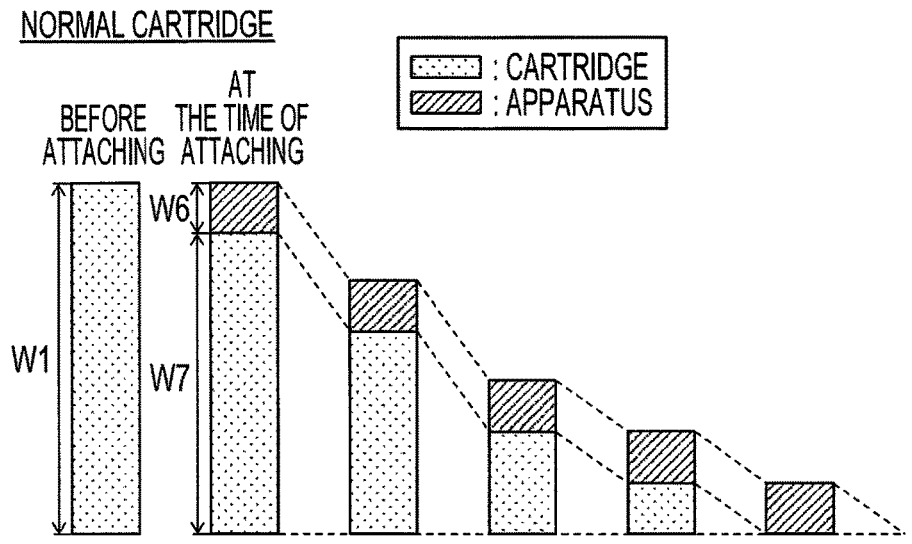
FIG. 10 is an explanatory diagram showing an example of change over time of apparatus remaining amount information stored in the apparatus memory and toner remaining amount information stored in the toner memory after a normal cartridge is attached to the main housing of the image forming apparatus.

For example, as shown in FIG. 10, before a new toner cartridge 4, which is a normal cartridge, is attached to the main housing 10, the toner memory 42 of the new toner cartridge 4 stores the "first remaining amount W1" as the toner remaining amount information. When the toner cartridge 4 is attached to the main housing 10, the controller 61 rewrites (changes) the toner remaining amount information of the toner memory 42 from the "first remaining amount W1" to the "seventh remaining amount W7". The "seventh remaining amount W7" is a value close to the state of "FULL".

The controller 61 stores the "seventh remaining amount W7" as the toner remaining amount information in the apparatus memory 62. The "seventh remaining amount W7" is the toner remaining amount information stored in the toner memory 42 of the toner cartridge 4 attached to the main housing 10. The controller 61 stores, in the apparatus memory 62, that the "seventh remaining amount W7" corresponds to the toner ID stored in the toner memory 42 of the toner cartridge 4 attached to the main housing 10. The controller 61 rewrites (changes) the "first remaining amount W1" stored in the apparatus memory 62 as the apparatus remaining amount information to the "sixth remaining amount W6". The "sixth remaining amount W6" is a value obtained by subtracting the "seventh remaining amount W7" from the "first remaining amount W1".

In S20, the controller 61 reads the toner remaining amount information and the apparatus remaining amount information from the apparatus memory 62. Then, the controller 61 calculates the total toner remaining amount WA by adding the sixth remaining amount W6 indicated by the apparatus remaining amount information to the seventh remaining amount W7 indicated by the toner remaining amount information. After that, the controller 61 executes processing in S21 to S23 described above.

In S13, in response to determining that the new consumable flag read in S12 is information indicating that the toner cartridge 4 is a "used consumable", the controller 61 proceeds from NO in S13 to S24.

In S24, the controller 61 reads, from the apparatus memory 62, the apparatus remaining amount information and the toner remaining amount information corresponding to the toner ID read in S12. When the apparatus remaining amount information corresponding to the toner ID is not present, the controller 61 may regard the remaining amount indicated by the apparatus remaining amount information as 0.

After the processing in S24, the controller 61 proceeds to S20. In S20, the controller 61 calculates the total toner remaining amount WA by adding the remaining amount indicated by the toner remaining amount information read in S24 to the remaining amount indicated by the apparatus remaining amount information read in S24. After that, the controller 61 executes processing in S21 to S23 described above.

[Processing Flow when Execution Instruction of Second Calculation Process is Received from Server]

Figure 7:
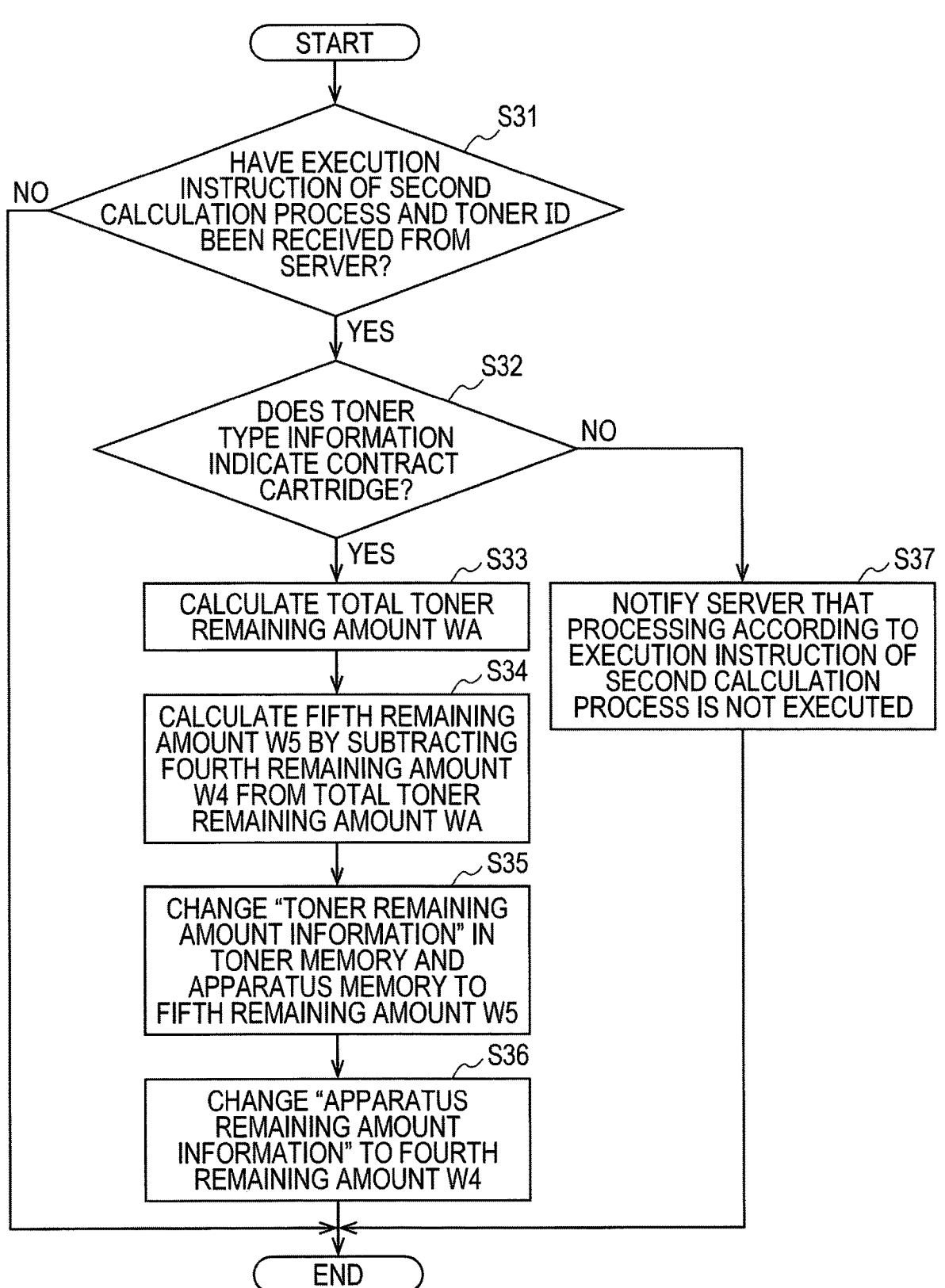
FIG. 7 is a flowchart showing an example of a second calculation process executed by the image forming apparatus after a particular period of time has elapsed.

Next, an example of a second calculation process executed by the controller 61 of the image forming apparatus 1 after elapse of the particular period will be described based on FIGS. 7 and 9. FIG. 7 illustrates an example of the second calculation process executed by the controller 61 after elapse of the particular period. The second calculation process is processing in which the controller 61 calculates the toner remaining amount information to be stored in the toner memory 42 and the apparatus memory 62 and the apparatus remaining amount information to be stored in the apparatus memory 62 after elapse of the particular period in a case where the toner cartridge 4 attached to the main housing 10 is a contract cartridge.

The server 8 starts measurement of time from start of the use of the toner cartridge 4 until the particular period elapses, in response to receiving the notification of the attachment information as described above. When the server 8 determines that the particular period has elapsed since reception of the notification of the attachment information, the server 8 transmits, to the image forming apparatus 1, an execution instruction of the second calculation process and the toner ID of the toner cartridge 4 attached to the main housing 10 of the image forming apparatus 1.

As shown in FIG. 7, in S31, the controller 61 determines whether an execution instruction of the second calculation process and the toner ID have been received from the server 8. In response to determining that the execution instruction of the second calculation process and the toner ID have been received, the controller 61 proceeds from YES in S31 to S32. In other words, the controller 61 executes an accepting process accepting the execution instruction of the second storing process described later from the server 8. In response to determining that the execution instruction of the second calculation process and the toner ID have not been received, the controller 61 ends the second calculation process.

In S32, the controller 61 determines whether the toner type information associated with the toner ID received in S31 is the information indicating that the toner cartridge 4 is the "contract cartridge". In response to determining that the toner type information associated with the toner ID received in S31 is the information indicating the "contract cartridge", the controller 61 proceeds from YES in S32 to S33.

In S33, the controller 61 reads the toner remaining amount information and the apparatus remaining amount information of the apparatus memory 62. The controller 61 calculates the total toner remaining amount WA by adding the third remaining amount W3 indicated by the apparatus remaining amount information to the second remaining amount W2 indicated by the toner remaining amount information. The total toner remaining amount WA is an example of the remaining amount obtained by adding the third remaining amount W3 to the second remaining amount W2.

In S34, the controller 61 calculates the fifth remaining amount W5 that is obtained by subtracting the fourth remaining amount W4 from the total toner remaining amount WA.

The fourth remaining amount W4 is a part of the total toner remaining amount WA. The fourth remaining amount W4 may be set in advance and may be stored in the apparatus memory 62 or the toner memory 42, for example. The controller 61 may calculate the fourth remaining amount W4 by multiplying the total toner remaining amount WA by the ratio indicated by third ratio information stored in the toner memory 42, for example. In this case, the controller 61 may read the third ratio information from the toner memory 42.

In S35, the controller 61 rewrites (changes) the toner remaining amount information of the toner memory 42 and the toner remaining amount information of the apparatus memory 62 from the second remaining amount W2 to the fifth remaining amount W5 calculated in S34. In other words, the controller 61 stores the fifth remaining amount W5 as the toner remaining amount information of the toner memory 42, instead of the second remaining amount W2.

In S36, the controller 61 rewrites (changes) the apparatus remaining amount information of the apparatus memory 62 from the third remaining amount W3 to the fourth remaining amount W4. In other words, the controller 61 stores the fourth remaining amount W4 in the apparatus memory 62, instead of the third remaining amount W3. The processing in S35 and S36 is an example of the second storing process.

By executing the second storing process in S35 and S36, the controller 61 transfers at least a part of the third remaining amount W3 stored in the apparatus memory 62 to the toner memory 42. Thus, the controller 61 causes the toner remaining amount information of the toner memory 42 to be closer to an actual amount of the toner contained in the toner cartridge 4. Thus, the controller 61 allows use of the toner cartridge 4 as the contract cartridge in another image forming apparatus after elapse of the particular period.

In S34 executed in a case where the toner cartridge 4 is the contract cartridge, the controller 61 subtracts the fourth remaining amount W4 from the total toner remaining amount WA such that the fifth remaining amount W5 becomes larger than the fourth remaining amount W4. That is, the fourth remaining amount W4 or the ratio indicated by the second ratio information is set such that the fifth remaining amount W5 is larger than the fourth remaining amount W4. For example, the fourth remaining amount W4 may be "0" which is a value corresponding to the "EMPTY" or a value close to the state of the "EMPTY". In this case, the fifth remaining amount W5 becomes the value corresponding to the "total toner remaining amount WA" or a value close to the "total toner remaining amount WA".

For example, as shown in FIG. 9, after the particular period has elapsed, the controller 61 rewrites (changes) the toner remaining amount information of the toner memory 42 from the "second remaining amount W2" to the "fifth remaining amount W5" obtained by subtracting the "fourth remaining amount W4" from the "total toner remaining amount WA". The controller 61 rewrites (changes) the toner remaining amount information of the apparatus memory 62 from the "second remaining amount W2" to the "fifth remaining amount W5". The controller 61 stores, in the apparatus memory 62, that the "fifth remaining amount W5" corresponds to the toner ID stored in the toner memory 42 of the toner cartridge 4 attached to the main housing 10. The fifth remaining amount W5 is a value corresponding to the "total toner remaining amount WA" or a value close to the "total toner remaining amount WA".

The controller 61 rewrites (changes) the apparatus remaining amount information of the apparatus memory 62 from the "third remaining amount W3" to the "fourth remaining amount W4". The controller 61 stores, in the apparatus memory 62, that the "fourth remaining amount W4" corresponds to the toner ID stored in the toner memory 42 of the toner cartridge 4 attached to the main housing 10.

Thus, in this embodiment, the controller 61 allows the use of the toner cartridge 4 in another image forming apparatus by rewriting (changing) the toner remaining amount information from the second remaining amount W2 to the fifth remaining amount W5 after the elapse of the particular period.

In response to determining in S32 that the toner type information corresponding to the toner ID read in S31 is the information indicating the "normal cartridge", the controller 61 proceeds from NO in S32 to S37. In S37, the controller 61 notifies the server 8 that the processing is not to be executed according to the execution instruction of the second calculation process, and ends the second calculation process.

[Processing Flow at End of Print Execution]

Figure 8:
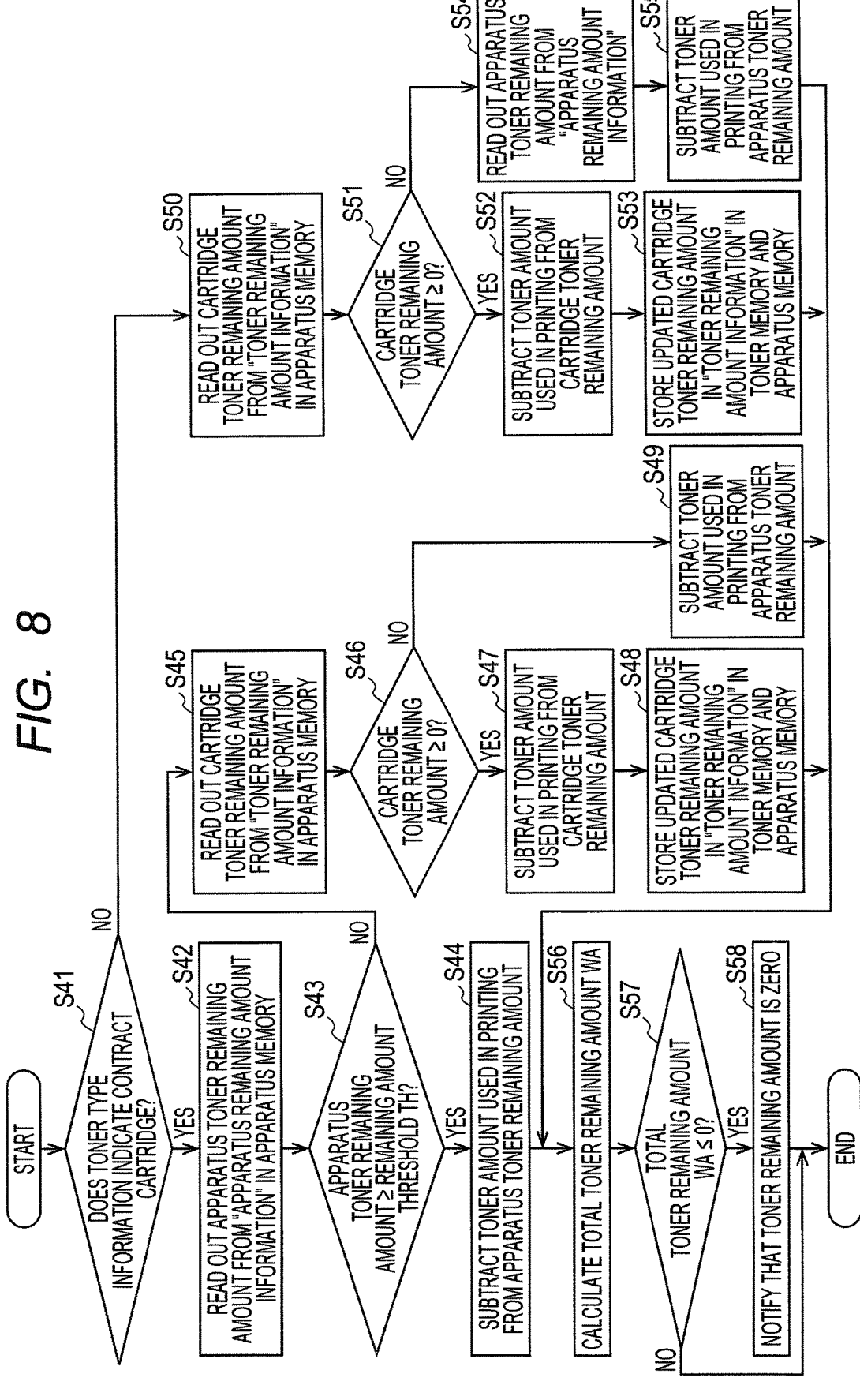
FIG. 8 is a flowchart showing an example of a third calculation process executed when the image forming apparatus finishes a printing process.

Next, an example of a third calculation process executed when the controller 61 of the image forming apparatus 1 ends a printing process will be described based on FIGS. 8 to 10. FIG. 8 illustrates an example of the third calculation process executed when the controller 61 ends the printing process. The third calculation process is processing of calculating at least the toner remaining amount information stored in the toner memory 42 and the apparatus memory 62 or the apparatus remaining amount information stored in the apparatus memory 62 each time the controller 61 performs printing. After the controller 61 ends the printing process, the controller 61 executes the processing shown in FIG. 8.

As shown in FIG. 8, in S41, the controller 61 first reads the toner type information of the toner memory 42. The controller 61 determines whether the toner type information read from the toner memory 42 is the information indicating that the toner cartridge 4 is the "contract cartridge". In response to determining that the toner type information is the information indicating that the toner cartridge 4 is the "contract cartridge", the controller 61 proceeds from YES in S41 to the processing in S42.

In S42, the controller 61 reads the toner ID of the toner memory 42. The controller 61 reads, from the toner information of the apparatus memory 62, the "apparatus toner remaining amount" stored as the "apparatus remaining amount information" corresponding to the toner ID read from the toner memory 42.

Before the elapse of the particular period, the "apparatus toner remaining amount" refers to the "third remaining amount W3" stored as the "apparatus remaining amount information" in the apparatus memory 62 when the controller 61 has executed the printing process. After the elapse of the particular period, the "apparatus toner remaining amount" refers to the "fourth remaining amount W4" stored as the "apparatus remaining amount information" in the apparatus memory 62 when the controller 61 has executed the printing process.

For example, as shown in FIG. 9, when the first printing is finished after the toner cartridge 4 has been attached to the main housing 10, the controller 61 reads the "third remaining amount W3" as the "apparatus remaining amount information" from the toner information of the apparatus memory 62. That is, the controller 61 reads, as the "apparatus toner remaining amount", the "third remaining amount W3" stored in the first storing process described above as the "apparatus remaining amount information" of the apparatus memory 62 when the toner cartridge 4 has been attached to the main housing 10.

In S43, the controller 61 determines whether the "apparatus remaining amount information" read from the toner information of the apparatus memory 62, that is, the "apparatus toner remaining amount" is larger than or equal to a remaining amount threshold TH. The remaining amount threshold TH may be set to a value capable of guaranteeing a print quality, for example, and may be a value somewhat larger than "0". In response to determining that the "apparatus toner remaining amount" read from the toner information of the apparatus memory 62 is larger than or equal to the remaining amount threshold TH, the controller 61 proceeds from YES in S43 to the processing in S44.

In S44, the controller 61 subtracts the toner amount used in the printing from the "apparatus toner remaining amount" read from the toner information of the apparatus memory 62. The controller 61 stores the "apparatus toner remaining amount" as the apparatus remaining amount information in the apparatus memory 62. The "apparatus toner remaining amount" stored in the apparatus memory 62 in S44 is the toner remaining amount obtained by subtracting the toner amount used in the printing from the "apparatus toner remaining amount" read by the controller 61 in S44. The controller 61 stores, in the apparatus memory 62, that the "apparatus toner remaining amount" corresponds to the toner ID stored in the toner memory 42 of the toner cartridge 4 attached to the main housing 10. After the processing in S44, the controller 61 proceeds to the processing in S56 described later.

Thus, as shown in FIG. 9, from the attachment of the toner cartridge 4 to the main housing 10 until the particular period has elapsed, the controller 61 subtracts the toner amount used in the printing from the third remaining amount W3 indicated by the apparatus remaining amount information of the apparatus memory 62 with priority each time the printing is finished. The controller 61 updates the third remaining amount W3 by storing the subtracted value as the apparatus remaining amount information. In the example in FIG. 9, the controller 61 does not subtract the toner amount from the second remaining amount W2 indicated by the toner remaining amount information of the apparatus memory 62.

In other words, when the controller 61 performs the printing between the first storing process and the second storing process, the controller 61 updates the third remaining amount W3 with priority such that the third remaining amount W3 indicated by the apparatus remaining amount information is larger than the second remaining amount W2 indicated by the toner remaining amount information. For example, the controller 61 updates the third remaining amount W3 before the third remaining amount W3 becomes empty (or a value close to empty), and updates the second remaining amount W2 after the third remaining amount W3 becomes empty. Further, before the third remaining amount W3 becomes empty, the controller 61 may update at least the second remaining amount W2 or the third remaining amount W3 such that the third remaining amount W3 is larger than the second remaining amount W2. An update process of the third remaining amount W3 by the controller 61 in S44 is an example of a first update process. The controller 61 may update the second remaining amount W2 or may update both the second remaining amount W2 and the third remaining amount W3 in S44 such that the third remaining amount W3 is larger than the second remaining amount W2.

In response to determining in S43 that the "apparatus toner remaining amount" read from the toner information of the apparatus memory 62 is smaller than the remaining amount threshold TH, the controller 61 proceeds from NO in S43 to the processing in S45. In S45, the controller 61 reads, from the toner information of the apparatus memory 62, the "cartridge toner remaining amount" stored as the "toner remaining amount information" corresponding to the toner ID read in S42.

Before the elapse of the particular period, the "cartridge toner remaining amount" is the "second remaining amount W2" stored in the apparatus memory 62 and the toner memory 42 as the "toner remaining amount information" when the controller 61 has executed the printing process. After the elapse of the particular period, the "cartridge toner remaining amount" is the "fifth remaining amount W5" stored in the apparatus memory 62 and the toner memory 42 as the "toner remaining amount information" when the controller 61 has executed the printing process.

For example, as shown in FIG. 9, when the first printing is finished after the particular period has elapsed since the toner cartridge 4 has been attached to the main housing 10, the controller 61 reads the "fifth remaining amount W5" as the "toner remaining amount information" from the toner information of the apparatus memory 62. That is, the controller 61 reads, as the "toner remaining amount", the "fifth remaining amount W5" stored in the second storing process described above as the "toner remaining amount information" of the apparatus memory 62 when the particular period has elapsed since the toner cartridge 4 has been attached to the main housing 10.

In S46, the controller 61 reads the "cartridge toner remaining amount" stored as the "toner remaining amount information" from the toner information of the apparatus memory 62. The controller 61 determines whether the "cartridge toner remaining amount" is larger than or equal to "0". In response to determining that the "cartridge toner remaining amount" read from the toner information of the apparatus memory 62 is larger than or equal to "0", the controller 61 proceeds from YES in S46 to the processing in S47.

In S47, the controller 61 reads the "cartridge toner remaining amount" as the "toner remaining amount information" from the toner information of the apparatus memory 62. The controller 61 subtracts the toner amount used in the printing from the read "cartridge toner remaining amount".

In S48, the controller 61 stores the "cartridge toner remaining amount" as the toner remaining amount information in the apparatus memory 62. The "cartridge toner remaining amount" stored in the apparatus memory 62 in S48 is the toner remaining amount obtained by subtracting the toner amount used in the printing from the "cartridge toner remaining amount" read by the controller 61 in S47. The controller 61 stores, in the apparatus memory 62, that the "cartridge toner remaining amount" corresponds to the toner ID stored in the toner memory 42 of the toner cartridge 4 attached to the main housing 10.

The controller 61 further stores the "cartridge toner remaining amount" as the toner remaining amount information in the toner memory 42. The "cartridge toner remaining amount" stored in the toner memory 42 in S48 is the toner remaining amount obtained by subtracting the toner amount used in the printing from the "cartridge toner remaining amount" read by the controller 61 in S47. After the processing in S48, the controller 61 proceeds to the processing in S56 described later.

In response to determining in S46 that the "cartridge toner remaining amount" read from the toner information of the apparatus memory 62 is smaller than "0", the controller 61 proceeds from NO in S46 to the processing in S49.

In S49, the controller 61 reads the "apparatus toner remaining amount" stored as the "apparatus remaining amount information" from the toner information of the apparatus memory 62. The controller 61 subtracts the toner amount used in the printing from the read "apparatus toner remaining amount". The controller 61 stores the "apparatus toner remaining amount" as the apparatus remaining amount information in the apparatus memory 62. The "apparatus toner remaining amount" stored in the apparatus memory 62 in S49 is the toner remaining amount obtained by subtracting the toner amount used in the printing from the "apparatus toner remaining amount" read by the controller 61 in S49. The controller 61 stores, in the apparatus memory 62, that the "apparatus toner remaining amount" corresponds to the toner ID stored in the toner memory 42 of the toner cartridge 4 attached to the main housing 10. After the processing in S49, the controller 61 proceeds to the processing in S56.

Thus, as shown in FIG. 9, after the particular period has elapsed since the toner cartridge 4 has been attached to the main housing 10, the controller 61 subtracts the toner amount used in the printing with priority from the fifth remaining amount W5 indicated by the toner remaining amount information of the apparatus memory 62 each time the printing is finished. That is, after the particular period has elapsed since the toner cartridge 4 has been attached to the main housing 10, the controller 61 updates the fifth remaining amount W5 indicated by the toner remaining amount information of the apparatus memory 62 with priority over the fourth remaining amount W4 indicated by the apparatus remaining amount information. When the toner remaining amount information becomes "0" (empty), the controller 61 updates the fourth remaining amount W4 by subtracting the toner amount used in the printing from the fourth remaining amount W4 indicated by the apparatus remaining amount information.

In other words, when the controller 61 performs the printing after the second storing process described above, the controller 61 updates the fifth remaining amount W5 or the fourth remaining amount W4 with priority such that the fifth remaining amount W5 indicated by the toner remaining amount information is larger than the fourth remaining amount W4 indicated by the apparatus remaining amount information. For example, the controller 61 updates the fifth remaining amount W5 before the fifth remaining amount W5 becomes empty (or a value close to empty), and updates the fourth remaining amount W4 after the fifth remaining amount W5 becomes empty. Further, before the fifth remaining amount W5 becomes empty, the controller 61 may update at least the fourth remaining amount W4 or the fifth remaining amount W5 such that the fifth remaining amount W5 is larger than the fourth remaining amount W4. The update process of the fifth remaining amount W5 or the fourth remaining amount W4 by the controller 61 in S47 to S49 is an example of the second update process. The controller 61 may update the fourth remaining amount W4 or may update both the fourth remaining amount W4 and the fifth remaining amount W5 such that the fifth remaining amount W5 is larger than the fourth remaining amount W4 in S47 and S48.

In response to determining in S41 that the toner type information is the information indicating that the toner cartridge 4 is the "normal cartridge", the controller 61 proceeds from NO in S41 to the processing in S50. In S50, the controller 61 reads the toner ID of the toner memory 42. The controller 61 reads the "cartridge toner remaining amount" stored as the "toner remaining amount information" corresponding to the read toner ID from the toner information of the apparatus memory 62.

For example, as shown in FIG. 10, when the first printing is finished after the toner cartridge 4 has been attached to the main housing 10, the controller 61 reads the seventh remaining amount W7 as the "toner remaining amount information" from the toner information of the apparatus memory 62. That is, the controller 61 reads, as the "cartridge toner remaining amount", the "seventh remaining amount W7" stored in the third storing process as the "toner remaining amount information" of the apparatus memory 62 when the toner cartridge 4 has been attached to the main housing 10.

In S51, the controller 61 determines whether the "toner remaining amount information" read from the toner information of the apparatus memory 62, that is, the "cartridge toner remaining amount" is larger than or equal to "0". In response to determining that the "cartridge toner remaining amount" read from the toner information of the apparatus memory 62 is larger than or equal to "0", the controller 61 proceeds from YES in S51 to the processing in S52.

In S52, the controller 61 reads the "cartridge toner remaining amount" as the "toner remaining amount information" from the toner information of the apparatus memory 62. The controller 61 subtracts the toner amount used in the printing from the read "cartridge toner remaining amount".

In S53, the controller 61 stores the "cartridge toner remaining amount" as the toner remaining amount information in the apparatus memory 62. The "cartridge toner remaining amount" stored in the apparatus memory 62 in S53 is the toner remaining amount obtained by subtracting the toner amount used in the printing from the "cartridge toner remaining amount" read by the controller 61 in S52. The controller 61 stores, in the apparatus memory 62, that the "cartridge toner remaining amount" corresponds to the toner ID stored in the toner memory 42 of the toner cartridge 4 attached to the main housing 10.

The controller 61 further stores the "cartridge toner remaining amount" as the toner remaining amount information in the toner memory 42. The "cartridge toner remaining amount" stored in the toner memory 42 in S53 is the toner remaining amount obtained by subtracting the toner amount used in the printing from the "cartridge toner remaining amount" read by the controller 61 in S52. After the processing in S53, the controller 61 proceeds to the processing in S56 described later.

In response to determining in S51 that the "cartridge toner remaining amount" read from the toner information of the apparatus memory 62 is smaller than "0", the controller 61 proceeds from NO in S51 to the processing in S54. In S54, the controller 61 reads the "apparatus toner remaining amount" stored as the "apparatus remaining amount information" from the toner information of the apparatus memory 62.

In S55, the controller 61 subtracts the toner amount used in the printing from the read "apparatus toner remaining amount". The controller 61 stores the "apparatus toner remaining amount" as the apparatus remaining amount information in the apparatus memory 62. The "apparatus toner remaining amount" stored in the apparatus memory 62 in S55 is the toner remaining amount obtained by subtracting the toner amount used in the printing from the "apparatus toner remaining amount" read by the controller 61 in S54. The controller 61 stores, in the apparatus memory 62, that the "apparatus toner remaining amount" corresponds to the toner ID stored in the toner memory 42 of the toner cartridge 4 attached to the main housing 10. After the processing in S55, the controller 61 proceeds to the processing in S56.

Thus, as shown in FIG. 10, after the toner cartridge 4 has been attached to the main housing 10, the controller 61 subtracts the toner amount used in the printing with priority from the seventh remaining amount W7 indicated by the toner remaining amount information of the apparatus memory 62 each time the printing is finished. When the toner remaining amount information becomes "0", the controller 61 updates the sixth remaining amount W6 by subtracting the toner amount used in the printing from the sixth remaining amount W6 indicated by the apparatus remaining amount information.

In other words, when the controller 61 performs the printing after the third storing process described above, the controller 61 updates the seventh remaining amount W7 with priority such that the seventh remaining amount W7 indicated by the toner remaining amount information is larger than the sixth remaining amount W6 indicated by the apparatus remaining amount information. For example, the controller 61 updates the seventh remaining amount W7 before the seventh remaining amount W7 becomes empty (or a value close to empty), and updates the sixth remaining amount W6 after the seventh remaining amount W7 becomes empty. Further, before the seventh remaining amount W7 becomes empty, the controller 61 may update at least the sixth remaining amount W6 or the seventh remaining amount W7 such that the seventh remaining amount W7 is larger than the sixth remaining amount W6. The update process of the seventh remaining amount W7 and the sixth remaining amount W6 by the controller 61 in S52 to S55 is an example of the third update process. The controller 61 may update the sixth remaining amount W6 or may update both the sixth remaining amount W6 and the seventh remaining amount W7 such that the seventh remaining amount W7 is larger than the sixth remaining amount W6 in S52 and S53.

After that, as shown in FIG. 8, in S56, the controller 61 reads the "cartridge toner remaining amount" stored as the toner remaining amount information and the "apparatus toner remaining amount" stored as the apparatus remaining amount information from the apparatus memory 62. The controller 61 adds the "cartridge toner remaining amount" and the "apparatus toner remaining amount" to calculate the total toner remaining amount WA.

In S57, the controller 61 determines whether the calculated total toner remaining amount WA is smaller than or equal to "0". That is, the controller 61 determines whether the toner initially contained in the toner cartridge 4 has been fully used for the printing. In response to determining that the calculated total toner remaining amount WA is not smaller than or equal to "0", that is, when it is NO in S57, the controller 61 ends the third calculation process. That is, in response to determining that the toner remains in the toner cartridge 4, the controller 61 ends the third calculation process.

In response to determining that the calculated total toner remaining amount WA is smaller than or equal to "0", that is, in response to determining that the toner initially contained in the toner cartridge 4 has been fully used for the printing, the controller 61 proceeds from YES in S57 to S58. In S58, the controller 61 notifies, through the display 64, that there is no toner contained in the toner cartridge 4 left, and ends the third calculation process.

According to the embodiment, when the toner cartridge 4 is a contract-dedicated consumable (for example, a contract cartridge), the controller 61 rewrites (changes) the first remaining amount W1 stored in the toner memory 42 to the second remaining amount W2 which is a part of the first remaining amount W1. Also, the controller 61 stores, in the apparatus memory 62, the third remaining amount W3 obtained by subtracting the second remaining amount W2 from the first remaining amount W1. In this way, by transferring a part of the first remaining amount W1 stored in the toner memory 42 to the apparatus memory 62, the controller 61 changes the conditions for using the contract consumable in the image forming apparatus. This allows the contract consumable to be used in another image forming apparatus based on the change of the conditions, for example, after a particular period of time has elapsed since the execution of the first storing process.

According to the embodiment, after the particular period has elapsed since the execution of the first storing process, the controller 61 rewrites (changes) the third remaining amount W3 stored in the apparatus memory 62 to the fourth remaining amount W4 which is a part of a remaining amount obtained by adding the third remaining amount W3 to the second remaining amount W2. Also, the controller 61 stores, in the toner memory 42, the fifth remaining amount W5 obtained by subtracting the fourth remaining amount W4 from the remaining amount in place of the second remaining amount W2. In this way, the controller 61 transfers at least part of the third remaining amount W3 stored in the apparatus memory 62 to the toner memory 42, so that the first remaining amount information stored in the toner memory 42 becomes closer to the actual amount of toner contained in the toner cartridge 4. This allows the contract consumable to be used in another image forming apparatus after the particular period has elapsed since the execution of the first storing process.

According to the embodiment, the controller 61 determines whether the toner cartridge 4 attached to the main housing is the contract consumable based on the type information stored in the toner memory 42.

According to the embodiment, the controller 61 executes the first storing process when the toner cartridge 4 attached to the main housing is the contract consumable. This allows the contract consumable attached to the main housing to be used in another image forming apparatuses.

According to the embodiment, the controller 61 executes the first storing process when the toner cartridge 4 attached to the main housing is a new contract consumable. This allows the contract consumable that has been attached to the image forming apparatus once to be used in another image forming apparatus.

According to the embodiment, the controller 61 makes the second remaining amount W2 stored in the toner memory 42 smaller than the actual amount of the toner contained in the toner cartridge 4. This increases the possibility that another image forming apparatuses does not allow the use of the toner cartridge 4 at a time point when the first storing process is executed.

According to the embodiment, if the controller 61 executes printing before the particular period elapses after executing the first storing process, a state is maintained in which the third remaining amount W3 stored in the apparatus memory 62 is larger than the second remaining amount W2 stored in the toner memory 42. This increases the possibility that another image forming apparatuses will not allow the use of consumable until the particular period has elapsed since the execution of the first storing process.

According to the embodiment, the controller 61 preferentially updates the third remaining amount W3, which is larger than the second remaining amount W2. This reduces the possibility of switching from updating the third remaining amount W3 stored in the apparatus memory 62 to updating the second remaining amount W2 stored in the toner memory 42. This reduces the possibility that the load on the controller 61 will increase.

According to the embodiment, the controller 61 executes the second storing process after the elapse of the particular period since the execution of the first storing process without a need of monitoring the elapse of the particular period from the execution of the first storing process.

According to the embodiment, the controller 61 makes the fifth remaining amount W5 stored in the toner memory 42 closer to the actual amount of the toner contained in the toner cartridge 4. This increases the possibility that another image forming apparatus allows the use of consumable by at a time point when the second storing process is executed.

According to the embodiment, if the controller 61 executes printing after the elapse of the particular period from execution of the first storing process, a state is maintained in which the fifth remaining amount W5 stored in the toner memory 42 is larger than the fourth remaining amount W4 stored in the apparatus memory 62. This increases the possibility that another image forming apparatus allows the use of the toner cartridge 4 after the particular period has elapsed.

According to the embodiment, the controller 61 preferentially updates the fifth remaining amount W5, which is larger than the fourth remaining amount W4. This reduces the possibility of switching from updating the fifth remaining amount W5 stored in the toner memory 42 to updating the fourth remaining amount W4 stored in the apparatus memory 62. This reduces the possibility that the load on the controller 61 will increase.

According to the embodiment, when the toner cartridge 4 is a normal consumable, the controller 61 stores, in the apparatus memory 62, the sixth remaining amount W6 which is a part of the first remaining amount W1 stored in the toner memory 42. Further, the controller 61 rewrites (changes) the first remaining amount W1 stored in the toner memory 42 to the seventh remaining amount W7 obtained by subtracting the sixth remaining amount W6 from the first remaining amount W1. In this way, the controller 61 transfers a part of the first remaining amount W1 stored in the toner memory 42 to the apparatus memory 62.

By attaching the toner cartridge 4 to the main housing, some amount of the toner contained in the toner cartridge 4 moves from the toner cartridge 4 to the main housing, and the actual amount of the toner contained in the toner cartridge 4 may become smaller than the first remaining amount W1 stored on the toner cartridge 4. By transferring a part of the first remaining amount W1 stored in the toner memory 42 to the apparatus memory 62 as described above, the first remaining amount W1 information stored in the toner memory 42 becomes closer to the actual amount of toner contained in the toner cartridge 4.

According to the embodiment, the seventh remaining amount W7 stored in the toner memory 42 becomes closer to the actual amount of the toner contained in the toner cartridge 4.

According to the embodiment, if the controller 61 executes printing after the third storing process, a state is maintained in which the seventh remaining amount W7 stored in the toner memory 42 is larger than the sixth remaining amount W6 stored in the apparatus memory 62. This maintains a state in which the seventh remaining amount W7 stored in the toner memory 42 is close to the actual amount of toner contained in the toner cartridge 4.

According to the embodiment, the controller 61 preferentially updates the seventh remaining amount W7 larger than the sixth remaining amount W6. This reduces the possibility of switching from updating the seventh remaining amount W7 stored in the toner memory 42 to updating the sixth remaining amount W6 stored in the apparatus memory 62. This reduces the possibility that the load on the controller 61 will increase.

MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

Modification 1

The drum cartridge 20 may include a development roller 41 in addition to the photosensitive drum 21, the cartridge housing, the drum memory 22, and a charger. In the cartridge housing, the photosensitive drum 21, the drum memory 22, the charger, and the development roller 41 are provided. The toner cartridge 4 includes the cartridge housing and the toner memory 42 but does not have the development roller 41. The cartridge housing contains the toner. An outer peripheral surface of the development roller 41 is in contact with an outer peripheral surface of the photosensitive drum 21 inside the drum cartridge 20.

Modification 2

The toner cartridge 4 may be constituted by two cartridges (not shown). A first cartridge of the two cartridges constituting the toner cartridge 4 includes the development roller 41. A second cartridge of the two cartridges constituting the toner cartridge 4 includes the cartridge housing and the toner memory 42. The cartridge housing contains the toner.

Modification 3

The image forming apparatus 1 may include one cartridge (not shown) instead of the drum cartridge 20 and the toner cartridge 4. The one cartridge includes the photosensitive drum 21, the cartridge housing, the memory, the charger, and the development roller 41. The outer peripheral surface of the development roller 41 is in contact with the outer peripheral surface of the photosensitive drum 21 inside the one cartridge. The cartridge housing of the one cartridge contains the toner.

Modification 4

In the image forming apparatus 1, the drum cartridge 20 and the toner cartridge 4 may be detachably attached mutually independently of each other with respect to the main housing 10.

Modification 5

The image forming apparatus 1 may be an MFP (Multifunction Printer or Multifunction Peripheral) also including other functions as a scanner or a facsimile. Even when the image forming apparatus 1 is an MFP, the image forming apparatus 1 may execute the various types of processing described in the above-described embodiment similarly to the image forming apparatus 1 of the above-described embodiment. The image forming apparatus 1 of this modification has effects similar to those of the image forming apparatus 1 of the above-described embodiment.

Modification 6

Print base material (print medium) of the image forming apparatus 1 is not limited to paper. For example, the print base material may be a tape. In a case where the print base material is a tape, a tape cassette which supplies a tape is attached to the image forming apparatus 1. The image forming apparatus 1 performs printing on the tape conveyed from the tape cassette. In this case, the image forming apparatus 1 may be a laser printer or an inkjet printer.

Modification 7

The image forming apparatus 1 may be an inkjet printer. In a case where the image forming apparatus 1 is the inkjet printer, not the drum cartridge 20 or the toner cartridge 4 described in the embodiments but an ink cartridge is attached to the cartridge holding portion 13 of the image forming apparatus 1. The number of ink cartridges attached to the image forming apparatus 1 is not particularly limited. For example, in the image forming apparatus 1, four ink cartridges in total corresponding to each of four colors of cyan, magenta, yellow, and black may be attached or only one color of black may be attached.

The ink cartridge includes a cartridge housing filled with ink which is consumable material, and an ink memory that stores ink cartridge information. The ink cartridge information may include, for example, an ink ID, ink type information, ink remaining amount information, a new consumable flag, and capacity information.

The ink ID is identification information of the ink cartridge and is information included in the ink cartridge information instead of the toner ID in the above-described embodiment. The ink type information is information indicating a type of the ink cartridge and is information included in the ink cartridge information instead of the toner type information in the above-described embodiment. The ink remaining amount information is information indicating a remaining amount of the ink in the ink cartridge and is information included in the ink cartridge information instead of the toner remaining amount information in the above-described embodiment. The new consumable flag and capacity information is information corresponding to information of the same name in the information related to the toner cartridge 4 in the above-described embodiment, in which the "toner" in the information related to the toner cartridge 4 is replaced with the "ink" and the "toner cartridge" with the "ink cartridge".

In the cartridge housing of the ink cartridge, an agitator for agitating the ink may be provided. The agitator operates in accordance with an instruction from the controller 61 in a state where the ink cartridge is attached to the image forming apparatus 1.

In a case where the image forming apparatus 1 is an inkjet printer, a flow of each processing illustrated in each flowchart described in the above-described embodiment is the same. Specifically, when the image forming apparatus 1 is an inkjet printer, the "toner cartridge 4" and the "toner memory 42" of the above-described embodiment may be read as an ink cartridge and an ink memory, respectively. Various types of information included in the information related to the toner cartridge 4 in the above-described embodiment may be read as corresponding information in the ink cartridge information. The image forming apparatus 1 of this modification has effects similar to those of the image forming apparatus 1 of the above-described embodiment.

By attaching the ink cartridge to the main housing, some amount of the ink contained in the ink cartridge moves from the ink cartridge to the main housing in some cases. By executing processing in S25 and S27 by the controller 61, even if some amount of the ink moves to the main housing, the ink remaining amount information of the ink memory is made closer to an actual amount of the ink contained in the ink cartridge.

EXAMPLE OF IMPLEMENTATION BY SOFTWARE

The functions of the image forming apparatus 1 (hereinafter referred to as "apparatus") may be realized by a program for causing a computer to function as the image forming apparatus 1, the program for operating the computer as the controller 61 of the image forming apparatus 1.

In this case, the image forming apparatus 1 includes a computer having at least one controller (for example, processor) and at least one storage device (for example, memory) as hardware for executing the above program. By executing the above program using the controller and the storage device, each function described in each of the above embodiments is realized.

The program may be recorded on one or more non-transitory computer-readable recording medium. This recording medium may or may not be included in the image forming apparatus 1. In the latter case, the program may be supplied to the image forming apparatus 1 via any wired or wireless transmission medium.

Also, part or all of the functions of the controller 61 may be realized by a logic circuit. For example, an integrated circuit in which logic circuits functioning as the above control blocks are formed is also included in the scope of the present disclosure.

What is claimed is:

1. An image forming apparatus comprising:
a main housing;
a consumable attachable to the main housing and usable in the image forming apparatus, the consumable containing consumable material, the consumable including a consumable memory being a non-transitory memory configured to store first remaining amount information, the first remaining amount information indicating a first remaining amount that is a current remaining amount of the consumable material in the consumable;
an apparatus memory being a non-transitory memory; and
a controller configured to execute:
a first storing process of, in a case where the consumable is a contract consumable that is usable when a contract for the image forming apparatus is set,
storing a second remaining amount in the consumable memory as the first remaining amount information, the second remaining amount being a part of the first remaining amount stored in the consumable memory; and
storing a third remaining amount in the apparatus memory, the third remaining amount being obtained by subtracting the second remaining amount from the first remaining amount,
wherein, when the consumable is attached to the image forming apparatus, the first remaining amount of the consumable material of the consumable is useable by the image forming apparatus; and
when the consumable is attached to another image forming apparatus, the second remaining amount of the consumable material of the consumable is useable by the another image forming apparatus.

2. The image forming apparatus according to claim 1, wherein the controller is configured to execute a second storing process of, in response to an elapse of a particular period after executing the first storing process,
storing a fourth remaining amount in the apparatus memory instead of the third remaining amount, the fourth remaining amount being a part of a remaining amount obtained by adding the second remaining amount to the third remaining amount stored in the apparatus memory; and
storing a fifth remaining amount in the consumable memory as the first remaining amount information, the fifth remaining amount being obtained by subtracting the fourth remaining amount from the remaining amount, thereby allowing a use of the consumable in another image forming apparatus.

3. The image forming apparatus according to claim 2, wherein the controller is configured to execute a first update process updating at least the second remaining amount or the third remaining amount in a case where printing is performed between the first storing process and the second storing process; and
wherein the controller is configured to update at least the second remaining amount or the third remaining amount such that the third remaining amount is larger than the second remaining amount in the first update process before the third remaining amount becomes empty.

4. The image forming apparatus according to claim 3, wherein the controller is configured to:
update the third remaining amount before the third remaining amount becomes empty, and update the second remaining amount after the third remaining amount becomes empty in the first update process.

5. The image forming apparatus according to claim 2, wherein the controller is configured to receive an execution instruction of the second storing process from an external apparatus configured to communicate with the image forming apparatus; and wherein the controller is configured to:

execute the second storing process in response to receiving the execution instruction of the second storing process from the external apparatus.

6. The image forming apparatus according to claim 2, wherein the fifth remaining amount is larger than the fourth remaining amount in the second storing process.

7. The image forming apparatus according to claim 6, wherein the controller is configured to execute a second update process updating at least the fourth remaining amount or the fifth remaining amount in a case where printing is executed after the second storing process; and wherein the controller is configured to update at least the fourth remaining amount or the fifth remaining amount such that the fifth remaining amount is larger than the fourth remaining amount in the second update process before the fifth remaining amount becomes empty.

8. The image forming apparatus according to claim 7, wherein the controller is configured to:

update the fifth remaining amount before the fifth remaining amount becomes empty in the second update process; and update the fourth remaining amount after the fifth remaining amount becomes empty in the second update process.

9. The image forming apparatus according to claim 1, wherein the consumable memory is configured to store type information indicating whether the consumable is the contract consumable or a normal consumable, the normal consumable being a consumable that is usable regardless of whether the contract is set; and wherein the controller is configured to determine whether the type information is information indicating the contract consumable.

10. The image forming apparatus according to claim 9, wherein the controller is configured to:

execute the first storing process in response to determining that the type information is information indicating the contract consumable.

11. The image forming apparatus according to claim 9, wherein the consumable memory is configured to store status information indicating whether the consumable is a new consumable or a used consumable;

wherein the controller is configured to determine whether the status information is information indicating that the consumable is the new consumable; and wherein the controller is configured to execute the first storing process in response to determining that the type information is information indicating the contract consumable and determining that the status information is information indicating the new consumable.

12. The image forming apparatus according to claim 1, wherein, in the first storing process, the third remaining amount is larger than the second remaining amount.

13. The image forming apparatus according to claim 1, wherein the controller is configured to execute a third storing process, in a case where the consumable is a normal consumable that is usable regardless of whether the contract is set, storing a sixth remaining amount in the apparatus memory, the sixth remaining amount being a part of the first remaining amount stored in the consumable memory; and storing a seventh remaining amount in the consumable memory as the first remaining amount information, the seventh remaining amount being obtained by subtracting the sixth remaining amount from the first remaining amount.

14. The image forming apparatus according to claim 13, wherein the seventh remaining amount is larger than the sixth remaining amount in the third storing process.

15. The image forming apparatus according to claim 14, wherein the controller is configured to execute a third update process updating at least the sixth remaining amount or the seventh remaining amount in a case where printing is executed after the third storing process; and wherein the controller is configured to update at least the sixth remaining amount or the seventh remaining amount such that the seventh remaining amount is larger than the sixth remaining amount in the third update process before the seventh remaining amount becomes empty.

16. The image forming apparatus according to claim 15, wherein the controller is configured to:

update the seventh remaining amount before the seventh remaining amount becomes empty in the third update process, and update the sixth remaining amount after the seventh remaining amount becomes empty in the third update process.

17. A control method of controlling an image forming apparatus in which a consumable is usable, the consumable containing consumable material, the consumable including a consumable memory being a non-transitory memory configured to store first remaining amount information, the first remaining amount information indicating a first remaining amount that is a current remaining amount of the consumable material in the consumable, the control method comprising:

in a case where the consumable is a contract consumable that is usable when a contract for the image forming apparatus is set, storing a second remaining amount in the consumable memory as the first remaining amount information, the second remaining amount being a part of the first remaining amount stored in the consumable memory; and storing a third remaining amount in an apparatus memory being a non-transitory memory of the image forming apparatus, the third remaining amount being obtained by subtracting the second remaining amount from the first remaining amount, wherein, when the consumable is attached to the image forming apparatus, the first remaining amount of the consumable material of the consumable is useable by the image forming apparatus; and when the consumable is attached to another image forming apparatus, the second remaining amount of the consumable material of the consumable is useable by the another image forming apparatus.

18. An image forming apparatus comprising:

a main housing;

a consumable attachable to and detachable from the main housing together with a non-transitory consumable memory, the consumable being usable in the image forming apparatus, the consumable containing consumable material, the consumable including the non-transitory consumable memory configured to store first remaining amount information, the first remaining amount information indicating a first remaining amount that is a current remaining amount of the consumable material in the consumable;

a non-transitory apparatus memory fixed to the image forming apparatus;
a connector electrically connectable to the consumable memory;
a print engine configured to perform printing by using the consumable material of the consumable; and
a controller configured to execute:
communicating with the consumable memory in a state where the consumable is attached to the main housing and the connector is electrically connected to the consumable memory;
a first storing process of, in a case where the consumable is a contract consumable that is usable when a contract for the image forming apparatus is set,
storing a second remaining amount in the consumable memory as the first remaining amount information, the second remaining amount being a part of the first remaining amount stored in the consumable memory; and
storing a third remaining amount in the apparatus memory, the third remaining amount being obtained by subtracting the second remaining amount from the first remaining amount;
performing printing by using the consumable material of the consumable; and
updating the third remaining amount stored in the apparatus memory based on an amount of the consumable material consumed by the printing.
19. The image forming apparatus according to claim 18, wherein the controller is configured to execute a second storing process of, in response to an elapse of a particular period after executing the first storing process,

storing a fourth remaining amount in the apparatus memory instead of the third remaining amount, the fourth remaining amount being a part of a remaining amount obtained by adding the second remaining amount to the third remaining amount stored in the apparatus memory, the fourth remaining amount being smaller than the third remaining amount; and
storing a fifth remaining amount in the consumable memory as the first remaining amount information, the fifth remaining amount being obtained by subtracting the fourth remaining amount from the remaining amount, the fifth remaining amount being larger than the second remaining amount, thereby allowing a use of the consumable in another image forming apparatus; and
wherein the controller is configured to execute, after executing the second storing process,
performing printing by using the consumable material of the consumable; and
updating the fifth remaining amount stored in the consumable memory based on an amount of the consumable material consumed by the printing.
20. The image forming apparatus according to claim 18, wherein the controller is configured to execute:
in a case where the consumable is a normal consumable that is usable regardless of whether a contract for the image forming apparatus is set, updating the first remaining amount stored in the consumable memory based on an amount of the consumable material consumed by the printing.

* * * * *